US011298871B2

(12) United States Patent
Hirai et al.

(10) Patent No.: US 11,298,871 B2
(45) Date of Patent: Apr. 12, 2022

(54) SOLUBLE MATERIAL FOR THREE-DIMENSIONAL MOLDING

(71) Applicant: KAO CORPORATION, Tokyo (JP)

(72) Inventors: Jouji Hirai, Wakayama (JP); Tadanori Yoshimura, Wakayama (JP); Tomoya Tsuboi, Sakai (JP); Hiroki Sawada, Wakayama (JP)

(73) Assignee: KAO CORPORATION, Tokyo (JP)

( * ) Notice: Subject to any disclaimer, the term of this patent is extended or adjusted under 35 U.S.C. 154(b) by 312 days.

(21) Appl. No.: 16/482,169

(22) PCT Filed: Jan. 25, 2018

(86) PCT No.: PCT/JP2018/002287
§ 371 (c)(1),
(2) Date: Jul. 30, 2019

(87) PCT Pub. No.: WO2018/139537
PCT Pub. Date: Aug. 2, 2018

(65) Prior Publication Data
US 2020/0055232 A1 Feb. 20, 2020

(30) Foreign Application Priority Data

Jan. 30, 2017 (JP) .............................. JP2017-014072
Jul. 28, 2017 (JP) .............................. JP2017-146414

(51) Int. Cl.
*B29C 64/118* (2017.01)
*B29C 64/40* (2017.01)
(Continued)

(52) U.S. Cl.
CPC ............ *B29C 64/118* (2017.08); *B29C 64/40* (2017.08); *B29K 2829/04* (2013.01);
(Continued)

(58) Field of Classification Search
CPC ....... B29C 64/118; B29C 64/40; B33Y 10/00; B33Y 70/00; B29K 2829/04; B29K 2995/0098
(Continued)

(56) References Cited

U.S. PATENT DOCUMENTS

2015/0232654 A1  8/2015  Sugihara et al.
2016/0067916 A1  3/2016  Hirata et al.
(Continued)

FOREIGN PATENT DOCUMENTS

CN    105398054 A    3/2016
CN    105555867 A    5/2016
(Continued)

OTHER PUBLICATIONS

JP-02209950-A, Kida et al., Aug. 21, 1990, machine translation JP to ENG. (Year: 1990).*
(Continued)

*Primary Examiner* — Joseph S Del Sole
*Assistant Examiner* — Lawrence D. Hohenbrink, Jr.
(74) *Attorney, Agent, or Firm* — Element IP, PLC

(57) ABSTRACT

The present invention is a soluble material for three-dimensional modeling that is used as a material of a support material for supporting a three-dimensional object when the three-dimensional object is manufactured by a 3D printer of a fused deposition modeling system and that contains a thermoplastic resin having a hydrophilic group and an organic salt compound represented by a general formula (I) below: $(R^1-SO_3^-)_n X^{n+}$ (I). According to the present invention, it is possible to provide a soluble material for three-dimensional modeling that is used for a support material and that is capable of suppressing the degradation of the modeling accuracy of a three-dimensional object when the three-dimensional object is manufactured by a 3D printer of
(Continued)

a fused deposition modeling system, and has a high rate of dissolution to neutral water to be removable speedily from a precursor of the three-dimensional object without use of a strong alkaline aqueous solution.

14 Claims, 1 Drawing Sheet

(51) Int. Cl.
  *B33Y 10/00*  (2015.01)
  *B33Y 70/00*  (2020.01)
(52) U.S. Cl.
  CPC ....... *B29K 2995/0098* (2013.01); *B33Y 10/00* (2014.12); *B33Y 70/00* (2014.12)
(58) Field of Classification Search
  USPC .......................................................... 264/442
  See application file for complete search history.

(56) References Cited

U.S. PATENT DOCUMENTS

| | | |
|---|---|---|
| 2016/0177078 A1 | 6/2016 | Naito et al. |
| 2017/0087775 A1 | 3/2017 | Sakai et al. |
| 2017/0232684 A1 | 8/2017 | Yoshimura et al. |
| 2018/0009160 A1* | 1/2018 | Sawada .................. B33Y 10/00 |

FOREIGN PATENT DOCUMENTS

| | | |
|---|---|---|
| CN | 105992688 A | 10/2016 |
| EP | 2902416 A1 | 8/2015 |
| EP | 3495118 A1 | 6/2019 |
| JP | 02209950 A * | 8/1990 |
| JP | H02-209950 A | 8/1990 |
| JP | 2002-516346 A | 6/2002 |
| JP | 2008-507619 A | 3/2008 |
| JP | 2016078284 A | 5/2016 |
| JP | 2017-030346 A | 2/2017 |
| WO | WO 99/60507 A1 | 11/1999 |
| WO | WO 2006/020279 A2 | 2/2006 |
| WO | WO 2014/051046 A1 | 4/2014 |
| WO | WO 2015/182681 A1 | 12/2015 |
| WO | WO 2016/125860 A1 | 8/2016 |

OTHER PUBLICATIONS

Extended European Search Report dated Nov. 25, 2020 in Application No. 18744014.4, 8 pages.
International Search Report for PCT/JP2018/002287 (PCT/ISA/210) dated Mar. 13, 2018, with English translation.
Search Report for Chinese Patent Application No. 201880000749.2, dated Jan. 23, 2019.
Written Opinion of the International Searching Authority for PCT/JP2018/002287 (PCT/ISA/237) dated Mar. 13, 2018, with English translation.

* cited by examiner

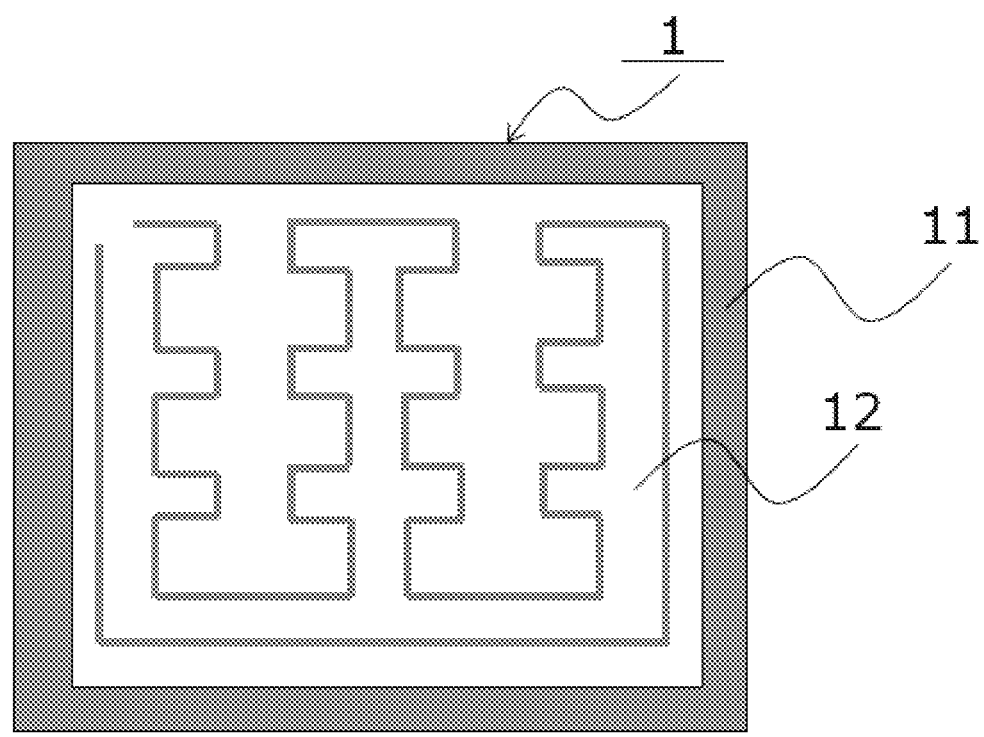

SOLUBLE MATERIAL FOR THREE-DIMENSIONAL MOLDING

TECHNICAL FIELD

The present invention relates to a soluble material for three-dimensional modeling that is used as a material of a support material that supports a three-dimensional object when manufacturing the three-dimensional object with a 3D printer, especially a fused deposition modeling type 3D printer.

BACKGROUND ART

The 3D printer is one type of rapid prototyping, and it is a three-dimensional printer for modeling a three-dimensional object based on 3D data such as 3D CAD and 3D CG. Systems of 3D printing have been known, such as a fused deposition modeling system (hereinafter referred to as an FDM system), an inkjet ultraviolet curing system, a stereolithography system, and a selective laser sintering system. Among these systems, the FDM system is a modeling system of heat-melting, extruding, and laminating polymer filaments to obtain a three-dimensional object, and the FDM system does not use a reaction of the material unlike other systems. Accordingly, a 3D printer of an FDM system is small and inexpensive, and has become popular in recent years as an apparatus with less post-processing. In order to model a three-dimensional object having a more complex shape in a FDM system, a modeling material constituting the three-dimensional object and a support material for supporting a three-dimensional structure of the modeling material are laminated to obtain a precursor of the three-dimensional object, and then the support material is removed from the precursor of the three-dimensional object to obtain the target three-dimensional object.

An example of the method of removing the support material from the precursor of the three-dimensional object is a method of using a methacrylic acid copolymer as the support material and soaking the precursor of the three-dimensional object in a strong alkaline solution to remove the support material (for example, JP-T-2008-507619). The method utilizes that carboxylic acid in the methacrylic acid copolymer is neutralized by an alkali and dissolved in an aqueous strong alkaline solution.

In the case of using, as a support material, the methacrylic acid copolymer disclosed in the document JP-A-2008-507619, an aqueous strong alkaline solution needs to be used to remove the support material from a precursor of a three-dimensional object. However, this aqueous strong alkaline solution is large in danger for people and in load onto the environment. Moreover, when a precursor of the three-dimensional object is immersed in the aqueous strong alkaline solution for a long term, the three-dimensional object in the precursor of the three-dimensional object tends to be eroded by the alkali. Thus, restrictions have been given to the use of any polyester resin, such as polylactic acid (PLA), which is low in resistance against alkalines, as a raw material of the three-dimensional object. Thus, support materials have been required which are removable not by any aqueous strong alkaline solution but by a neutral water having a pH of 6 to 8.

Against this problem, the document JP-A-2002-516346 discloses a method of using poly(2-ethyl-2-oxazoline), which is soluble in water, as a support material, and immersing a precursor of a three-dimensional object in water, so as to remove the support material therein. According to the method described in this document JP-A-2002-516346, the support material in the precursor of the three-dimensional object can be removed without using any aqueous strong alkaline solution. However, poly(2-ethyl-2-oxazoline), which is contained in the soluble material for three-dimensional modeling, is high in affinity with water. Thus, when the soluble material for three-dimensional modeling, which contains poly(2-ethyl-2-oxazoline), is exposed to a high humidity, this polymer absorbs water in the air. When the soluble material for three-dimensional modeling, which contains poly(2-ethyl-2-oxazoline) containing the water and further contains others, is heated, melted, printed out and laminated, using a 3D printer of an FDM system, the water is vaporized and scattered by high temperature so that the soluble material is foamed. Consequently, the precision (In the present specification, dimensional precision is also referred to simply as "precision") of the resultant three-dimensional object is remarkably damaged.

In order to solve the above problems, the inventors of the present invention have filed a patent application (Japanese Patent Application No. 2016-019789) for an invention of a soluble material for three-dimensional modeling that is used for a support material and that is suitable for the manufacturing of a three-dimensional object by an FDM system, has moisture absorption resistance, and has a high rate of dissolution to neutral water to be removable speedily from a precursor of the three-dimensional object without use of a strong alkaline aqueous solution.

SUMMARY OF THE INVENTION

A soluble material for three-dimensional modeling according to the present invention is a soluble material for three-dimensional modeling that is used as a material of a support material for supporting a three-dimensional object when the three-dimensional object is manufactured by a 3D printer of a fused deposition modeling system and that contains a thermoplastic resin having a hydrophilic group and an organic salt compound represented by a general formula (I) below:

$$(R^1\text{—}SO_3^-)_n X^{n+} \qquad (I).$$

In the general formula (I), $R^1$ represents a hydrocarbon group that optionally has a substituent group and that has 1 to 30 carbon atoms; n represents a number of 1 or 2; when n is 1, $X^{n+}$ represents a sodium ion, a potassium ion, a lithium ion, an ammonium ion, or a phosphonium ion; and when n is 2, $X^{n+}$ represents a magnesium ion, a calcium ion, a barium ion, or a zinc ion.

A method for manufacturing a three-dimensional object according to the present invention is a method for manufacturing a three-dimensional object by a fused deposition modeling system, the method including a step of obtaining a precursor of the three-dimensional object that contains the three-dimensional object and a support material; and a support material removing step of bringing the precursor of the three-dimensional object into contact with neutral water to remove the support material, in which a material of the support material is the soluble material for three-dimensional modeling.

A support material according to the present invention is a support material for supporting a three-dimensional object when the three-dimensional object is manufactured by a 3D printer of a fused deposition modeling system, the support material containing a thermoplastic resin having a hydrophilic group and an organic salt compound represented by a general formula (I) below:

$$(R^1-SO_3^-)_n X^{n+} \tag{I}$$

In the general formula (I), $R^1$ represents a hydrocarbon group that optionally has a substituent group and that has 1 to 30 carbon atoms; n represents a number of 1 or 2; when n is 1, $X^{n+}$ represents a sodium ion, a potassium ion, a lithium ion, an ammonium ion, or a phosphonium ion; and when n is 2, $X^{n+}$ represents a magnesium ion, a calcium ion, a barium ion, or a zinc ion.

BRIEF DESCRIPTION OF THE DRAWING

FIG. 1 is a photograph showing the shape of an evaluation sample of an example.

MODE FOR CARRYING OUT THE INVENTION

The soluble material for three-dimensional modeling has poor adhesive properties to a modeling material, and a support material formed from the soluble material for three-dimensional modeling has tended to peel from the modeling material. When peeled from the modeling material before sufficient solidification of the modeling material in manufacturing a three-dimensional object, the support material is incapable of sufficiently supporting a three-dimensional structure of the modeling material to degrade the modeling accuracy of the three-dimensional object.

The present invention provides a soluble material for three-dimensional modeling that is used for a support material and that has sufficient adhesive properties to a modeling material even when used for manufacturing a three-dimensional object by a 3D printer of an FDM system and has a high rate of dissolution to neutral water to be removable speedily from a precursor of the three-dimensional object without use of a strong alkaline aqueous solution.

The present invention provides a method for manufacturing a three-dimensional object that is capable of suppressing the degradation of the modeling accuracy of a three-dimensional object and has a high rate of dissolution to neutral water to be removable speedily from a precursor of the three-dimensional object without use of a strong alkaline aqueous solution.

The present invention provides a support material that has sufficient adhesive properties to a modeling material and has a high rate of dissolution to neutral water to be removable speedily from a precursor of the three-dimensional object without use of a strong alkaline aqueous solution.

A soluble material for three-dimensional modeling according to the present invention is a soluble material for three-dimensional modeling that is used as a material of a support material for supporting a three-dimensional object when the three-dimensional object is manufactured by a 3D printer of a fused deposition modeling system and that contains a thermoplastic resin having a hydrophilic group and an organic salt compound represented by a general formula (I) below:

$$(R^1-SO_3^-)_n X^{n+} \tag{I}$$

In the general formula (I), $R^1$ represents a hydrocarbon group that optionally has a substituent group and that has 1 to 30 carbon atoms; n represents a number of 1 or 2; when n is 1, $X^{n+}$ represents a sodium ion, a potassium ion, a lithium ion, an ammonium ion, or a phosphonium ion; and when n is 2, $X^{n+}$ represents a magnesium ion, a calcium ion, a barium ion, or a zinc ion.

A method for manufacturing a three-dimensional object according to the present invention is a method for manufacturing a three-dimensional object by a fused deposition modeling system, the method including a step of obtaining a precursor of the three-dimensional object that contains the three-dimensional object and a support material; and a support material removing step of bringing the precursor of the three-dimensional object into contact with neutral water to remove the support material, in which a material of the support material is the soluble material for three-dimensional modeling.

A support material according to the present invention is a support material for supporting a three-dimensional object when the three-dimensional object is manufactured by a 3D printer of a fused deposition modeling system, the support material containing a thermoplastic resin having a hydrophilic group and an organic salt compound represented by a general formula (I) below:

$$(R^1-SO_3^-)_n X^{n+} \tag{I}$$

In the general formula (I), $R^1$ represents a hydrocarbon group that optionally has a substituent group and that has 1 to 30 carbon atoms; n represents a number of 1 or 2; when n is 1, $X^{n+}$ represents a sodium ion, a potassium ion, a lithium ion, an ammonium ion, or a phosphonium ion; and when n is 2, $X^{n+}$ represents a magnesium ion, a calcium ion, a barium ion, or a zinc ion.

According to the present invention, it is possible to provide a soluble material for three-dimensional modeling that is used for a support material and that has sufficient adhesive properties to a modeling material even when used for manufacturing a three-dimensional object by a 3D printer of an FDM system and has a high rate of dissolution to neutral water to be removable speedily from a precursor of the three-dimensional object without use of a strong alkaline aqueous solution.

According to the present invention, it is possible to provide a method for manufacturing a three-dimensional object that is capable of suppressing the degradation of the modeling accuracy of a three-dimensional object and has a high rate of dissolution to neutral water to be removable speedily from a precursor of the three-dimensional object without use of a strong alkaline aqueous solution.

According to the present invention, it is possible to provide a support material that has sufficient adhesive properties to a modeling material and has a high rate of dissolution to neutral water to be removable speedily from a precursor of the three-dimensional object without use of a strong alkaline aqueous solution.

Hereinafter, one embodiment of the present invention is described.

<Soluble Material for Three-Dimensional Modeling>

A soluble material for three-dimensional modeling according to the present embodiment is a soluble material for three-dimensional modeling that is used as a material of a support material for supporting a three-dimensional object when the three-dimensional object is manufactured by a 3D printer of a fused deposition modeling system and that contains a thermoplastic resin having a hydrophilic group and an organic salt compound represented by a general formula (I) below:

$$(R^1-SO_3^-)_n X^{n+} \tag{I}$$

In the general formula (I), $R^1$ represents a hydrocarbon group that optionally has a substituent group and that has 1 to 30 carbon atoms; n represents a number of 1 or 2; when n is 1, $X^{n+}$ represents a sodium ion, a potassium ion, a lithium ion, an ammonium ion, or a phosphonium ion; and when n is 2, $X^{n+}$ represents a magnesium ion, a calcium ion, a barium ion, or a zinc ion.

A support material formed using, as a material, the soluble material for three-dimensional modeling according to the present embodiment has sufficient adhesive properties to a modeling material and has a high rate of dissolution to neutral water to be removable speedily from a precursor of the three-dimensional object without use of a strong alkaline aqueous solution.

From the viewpoint of solubility in neutral water having a pH of 6 to 8 which is not a strongly alkaline aqueous solution, the thermoplastic resin has the hydrophilic group. Examples of the hydrophilic group are at least one type selected from the group consisting of a primary amino group, a secondary amino group, a tertiary amino group, a quaternary ammonium salt group, an oxyethylene group, a hydroxyl group, a carboxyl group, a carboxyl salt group, an amide group, a phosphoric acid group, a phosphate group, a sulfonic acid group, and a sulfonate group. The hydrophilic group is preferably at least one type selected from the group consisting of a sulfonic acid group, and a sulfonate group and more preferably a sulfonate group.

From a viewpoint of the solubility into neutral water, the content of the hydrophilic group in the thermoplastic resin is preferably 0.5 mmol/g or more, more preferably 0.6 mmol/g or more, and further preferably 0.7 mmol/g or more; and from a viewpoint of moisture absorption resistance, it is preferably 3.0 mmol/g or less, more preferably 2.0 mmol/g or less, and further preferably 1.0 mmol/g or less. From the viewpoint of the solubility into neutral water and the viewpoint of moisture absorption resistance, the content of the hydrophilic group in the thermoplastic resin is preferably 0.5 mmol/g to 3.0 mmol/g, more preferably 0.6 mmol/g to 2.0 mmol/g, and further preferably 0.7 mmol/g to 1.5 mmol/g.

A modeling material with high heat resistance generally has a high melting point, or a high glass transition temperature, and when the temperature for subjecting the modeling material to heat-melting, extrusion, and layering by a 3D printer is remarkably different from the temperature of the support material contacting the modeling material, the modeling accuracy of a three-dimensional object is sometimes deteriorated. Therefore, when the modeling material having a high melting point, or a high glass transition temperature is heat-melted and subjected to extrusion and layering by a 3D printer, the soluble material for three-dimensional modeling that is a material of the support material is also heated to a temperature close to the temperature of the modeling material, melted, and subjected to extrusion and layering. In this case, the soluble material for three-dimensional modeling that is a material of the support material removable by a non-strong alkaline aqueous solution, neutral water having a pH of 6 to 8 also preferably has a high melting point, or a high glass transition temperature. Therefore, the thermoplastic resin is preferably at least one type selected from the group consisting of a polyester resin having the hydrophilic group, a polyamide resin having the hydrophilic group, an acrylic resin having the hydrophilic group, a polyvinyl alcohol resin having the hydrophilic group, a polyvinyl pyrrolidone resin having the hydrophilic group, an ester amide resin having the hydrophilic group, and a urethane resin having the hydrophilic group. The thermoplastic resin is more preferably at least one type selected from the group consisting of a polyester resin having the hydrophilic group and a polyamide resin having the hydrophilic group.

[Polyester Resin Having Hydrophilic Group]

An example of the polyester resin is a polyester resin having a hydrophilic monomer unit $A_1$ having the hydrophilic group, a hydrophobic dicarboxylic acid monomer unit $B_1$, and a diol monomer unit; in which a ratio of the hydrophilic monomer unit $A_1$ to a total amount of the hydrophilic monomer unit $A_1$ having a hydrophilic group and the hydrophobic dicarboxylic acid monomer unit $B_1$ in the polyester resin is 10 mol % to 70 mold.

(Hydrophilic Monomer Unit $A_1$)

The polyester resin has a hydrophilic monomer unit $A_1$ having the hydrophilic group. The hydrophilic monomer unit $A_1$ is not particularly limited as long as it is a monomer unit having a hydrophilic group. A monomer for deriving the hydrophilic monomer unit $A_1$ is also referred to as a monomer $A_1$.

From the viewpoint of solubility in neutral water having a pH of 6 to 8 which is not a strongly alkaline aqueous solution, the hydrophilic group is preferably at least one type selected from the group consisting of a primary amino group, a secondary amino group, a tertiary amino group, a quaternary ammonium salt group, an oxyethylene group, a hydroxyl group, a carboxyl group, a carboxyl salt group, an amide group, a phosphoric acid group, a phosphate group, a sulfonic acid group, and a sulfonate group; more preferably at least one type selected from the group consisting of a sulfonic acid group, and a sulfonate group; and further preferably a sulfonate group.

From a viewpoint of the solubility into neutral water and a viewpoint of the easiness of the polymerization when producing the polyester resin, the secondary amino group is preferably at least one type selected from the group consisting of a secondary amino group represented by —$NHR^2$ ($R^2$ represents a straight chain or branched alkyl group having 1 to 14 carbon atoms) and a secondary amino group represented by —NH—.

From a viewpoint of the solubility into neutral water and a viewpoint of the easiness of the polymerization when producing the polyester resin, the tertiary amino group is preferably at least one type selected from the group consisting of a tertiary amino group represented by —$NR^3R^4$ ($R^3$ represents a straight chain or branched alkyl group having 1 to 14 carbon atoms and $R^4$ represents a straight chain or branched alkyl group having 1 to 14 carbon atoms) and a tertiary amino group represented by —$NR^5$— ($R^5$ represents a straight chain or branched alkyl group having 1 to 14 carbon atoms).

From a viewpoint of the solubility into neutral water and a viewpoint of the easiness of the polymerization when producing the polyester resin, the quaternary ammonium salt group is preferably at least one type selected from the group consisting of a quaternary ammonium salt group represented by —$N^+\{R^6R^7R^8\}$. $X^-$ (Each of $R^6$, $R^7$, and $R^8$ represents a hydrogen atom or an alkyl group having 1 to 14 carbon atoms and $X^-$ represents a hydroxy ion, a halogen ion, $CH_3SO_4^-$, or $CH_3CH_2SO_4^-$.

From a viewpoint of the solubility into neutral water and a viewpoint of the easiness of the polymerization when producing the polyester resin, the oxyethylene group is preferably at least one type selected from the group consisting of an oxyethylene group represented by —$\{CH_2CH_2O\}_{j1}$— (j1 represents an average number and it is an integer of 1 to 2,500, preferably 2 to 1,000, more preferably 3 to 100, and further preferably 4 to 50) and an oxyethylene group represented by —$\{CH_2CH_2O\}_{m1}$—$R^9$ (m1 represents an average number and it is an integer of 1 to 2,500, preferably 2 to 1,000, more preferably 3 to 100, and further preferably 4 to 50. $R^9$ represents a hydrogen atom or a straight chain or branched alkyl group having 1 to 10 carbon atoms and it is more preferably 2 to 6 and further preferably 3 to 5).

From a viewpoint of the solubility into neutral water and a viewpoint of the easiness of the polymerization when producing the polyester resin, the carboxyl salt group is preferably a carboxyl salt group represented by —COOM$^1$ (M$^1$ represents a counterion of a carboxyl group constituting the carboxyl salt group; and from a viewpoint of the solubility into neutral water, it is preferably at least one type selected from the group consisting of a sodium ion, a potassium ion, a lithium ion, calcium ion, a magnesium ion, an ammonium ion, a barium ion, and a zinc ion; more preferably at least one type selected from the group consisting of a sodium ion, a potassium ion, a lithium ion, a magnesium ion, and an ammonium ion; further preferably at least one type selected from the group consisting of a sodium ion and a potassium ion; and further more preferably a sodium ion).

From a viewpoint of the solubility into neutral water and a viewpoint of the easiness of the polymerization when producing the polyester resin, the phosphate group is preferably at least one type selected from the group consisting of a phosphate group represented by —PO$_4$M$^2{}_2$, —PO$_4$HM$^2$, and —PO$_4$M$^2$ (M$^2$ represents a counterion of a phosphoric acid group constituting the phosphate group; and from a viewpoint of the solubility into neutral water, it is preferably at least one type selected from the group consisting of a sodium ion, a potassium ion, a lithium ion, calcium ion, a magnesium ion, an ammonium ion, a barium ion, and a zinc ion; more preferably at least one type selected from the group consisting of a sodium ion, a potassium ion, a lithium ion, a magnesium ion, and an ammonium ion; further preferably at least one type selected from the group consisting of a sodium ion and a potassium ion; and further more preferably a sodium ion).

From a viewpoint of the solubility into neutral water and a viewpoint of the easiness of the polymerization when producing the polyester resin, the sulfonate group is preferably a sulfonate group represented by —SO$_3$M$^3$ (M$^3$ represents a counterion of a sulfonic acid group constituting the sulfonate group; and from a viewpoint of the solubility into neutral water, it is preferably at least one type selected from the group consisting of a sodium ion, a potassium ion, a lithium ion, calcium ion, a magnesium ion, an ammonium ion, a barium ion, and a zinc ion; more preferably at least one type selected from the group consisting of a sodium ion, a potassium ion, a lithium ion, a magnesium ion, and an ammonium ion; further preferably at least one type selected from the group consisting of a sodium ion and a potassium ion; and further more preferably a sodium ion).

From a viewpoint of the solubility into neutral water, a viewpoint of moisture absorption resistance, a viewpoint of heat resistance required for modeling by a 3D printer, and a viewpoint of the easiness of the polymerization when producing the polyester resin, the monomer $A_1$ is preferably at least one type selected from the group consisting of carboxylic acid, amine, and amino acid, and more preferably carboxylic acid. Among the type of carboxylic acid, from the same viewpoints, aromatic carboxylic acid is preferable; and at least one type selected from the group consisting of hydroxy group-containing aromatic dicarboxylic acid, primary amino group-containing aromatic dicarboxylic acid, sulfonic acid group-containing aromatic dicarboxylic acid, and sulfonate group-containing aromatic dicarboxylic acid are more preferable. Among those, from the same viewpoints, at least one type selected from the group consisting of 5-hydroxyisophthalic acid, 1,3,5-benzene tricarboxylic acid, 5-aminoisophthalic acid, 5-sulfoisophthalic acid, 2-sulfoterephthalic acid, and 4-sulfo-2,6-naphthalene dicarboxylic acid are preferable; at least one type selected from the group consisting of 5-sulfoisophthalic acid and 2-sulfoterephthalic acid are more preferable; and 5-sulfoisophthalic acid is further preferable.

From a viewpoint of the solubility into neutral water, the content of the hydrophilic group in the polyester resin is preferably 0.5 mmol/g or more, more preferably 0.6 mmol/g or more, and further preferably 0.7 mmol/g or more; and from a viewpoint of moisture absorption resistance, it is preferably 3.0 mmol/g or less, more preferably 1.5 mmol/g or less, and further preferably 1.0 mmol/g or less. From the viewpoint of the solubility into neutral water and the viewpoint of moisture absorption resistance, the content of the hydrophilic group in the polyester resin is preferably 0.5 mmol/g to 3.0 mmol/g, more preferably 0.6 mmol/g to 1.5 mmol/g, and further preferably 0.7 mmol/g to 1.0 mmol/g.

From a viewpoint of the solubility into neutral water, the ratio of the amount of the hydrophilic monomer unit $A_1$ to the total amount of monomer units in the polyester resin is 5 mol % or more, preferably 7 mol % or more, more preferably 10 mol % or more, and further preferably 12 mol % or more; and from a viewpoint of moisture absorption resistance, it is 35 mol % or less, preferably 33 mol % or less, more preferably 32 mol % or less, and further preferably 30 mol % or less. From the viewpoint of the solubility into neutral water, the ratio of the amount of the hydrophilic monomer unit $A_1$ to the total amount of monomer units in the polyester resin is preferably 5 mol % to 35 mol %, more preferably 7 mol % to 33 mol %, further preferably 10 mol % to 32 mol %, and further more preferably 12 mol % to 30 mol %. From the viewpoint of the solubility into neutral water and from the viewpoint of moisture absorption resistance, the ratio of the amount of the hydrophilic monomer unit $A_1$ to the total amount of monomer units in the polyester resin is further more preferably 8 mol % to 13 mol %.

[Hydrophobic Dicarboxylic Acid Monomer Unit $B_1$]

The polyester resin has a hydrophobic dicarboxylic acid monomer unit $B_1$. The dicarboxylic acid monomer unit $B_1$ does not have a hydrophilic group. In the present specification, dicarboxylic acid for deriving the hydrophobic dicarboxylic acid monomer unit $B_1$ is also referred to as dicarboxylic acid $B_1$.

The dicarboxylic acid $B_1$ is not particularly limited as long as it is dicarboxylic acid. However, from a viewpoint of the solubility into neutral water, a viewpoint of moisture absorption resistance, a viewpoint of heat resistance required for modeling by a 3D printer, and a viewpoint of the easiness of the polymerization when producing the polyester resin, the dicarboxylic acid $B_1$ is preferably at least one type selected from the group consisting of aromatic dicarboxylic acid, aliphatic dicarboxylic acid, and alicyclic dicarboxylic acid. Among these, from the same viewpoints, at least one type selected from the group consisting of terephthalic acid, isophthalic acid, 2,5-furan dicarboxylic acid, 2,6-naphthalene dicarboxylic acid, 1,4-cyclohexane dicarboxylic acid, and 1,3-adamantane dicarboxylic acid are more preferable; and at least one type selected from the group consisting of terephthalic acid, 2,5-furan dicarboxylic acid, and 2,6-naphthalene dicarboxylic acid are further preferable; and 2,6-naphthalene dicarboxylic acid are further more preferable.

From a viewpoint of moisture absorption resistance, the ratio of the amount of the hydrophobic dicarboxylic acid monomer unit $B_1$ in the polyester resin to the total amount of monomer units in the polyester resin is preferably 15 mol % or more, more preferably 18 mol % or more, and further preferably 20 mol % or more; and from a viewpoint of the solubility into neutral water, it is preferably 45 mol % or less, more preferably 42 mol % or less, and further preferably 40 mol % or less. From the viewpoint of moisture absorption resistance and the viewpoint of the solubility into neutral water, the ratio of the amount of the hydrophobic dicarboxylic acid monomer unit $B_1$ in the polyester resin to the total amount of monomer units in the polyester resin is preferably 15 mol % to 45 mol %, more preferably 20 mol % to 42 mol %, and further preferably 30 mol % to 40 mol %.

From the viewpoints of the solubility into neutral water, moisture absorption resistance, and heat resistance required for modeling by a 3D printer, the mole ratio of the hydrophilic monomer unit $A_1$ to the hydrophobic dicarboxylic acid monomer unit $B_1$ (hydrophilic monomer unit $A_1$/hydrophobic dicarboxylic acid monomer unit $B_1$) is preferably 10/90 or more, more preferably 15/85 or more, further preferably 18/82 or more, and further more preferably 20/80 or more; and from the same viewpoints, it is preferably 70/30 or less, more preferably 65/35 or less, further preferably 60/40 or less, further more preferably 40/60 or less, and further more preferably 26/74 or less.

[Diol Monomer Unit]

The polyester resin has a diol monomer unit. The diol for deriving the diol monomer unit is also referred to as diol C.

The diol C is not particularly limited, and aliphatic diol, aromatic diol, etc. can be used. However, from a viewpoint of the production cost of the polyester resin, the diol C is preferably aliphatic diol.

From the viewpoints of the solubility into neutral water, moisture absorption resistance, and heat resistance required for modeling by a 3D printer, the number of carbon atoms in the diol C is preferably 2 or more; and from the same viewpoints, it is preferably 31 or less, more preferably 25 or less, further preferably 20 or less, and further more preferably 15 or less.

An example of the aliphatic diol is at least one type selected from the group consisting of chain diol and cyclic diol. From the viewpoints of the solubility into neutral water, moisture absorption resistance, and toughness (strength) required for modeling by a 3D printer, chain diol is preferable.

From the viewpoints of the solubility into neutral water, moisture absorption resistance, and heat resistance required for modeling by a 3D printer, the number of carbon atoms in the chain diol is preferably 2 or more; and from the same viewpoints, it is preferably 6 or less, more preferably 4 or less, and further preferably 3 or less.

From the viewpoints of the solubility into neutral water, moisture absorption resistance, and heat resistance required for modeling by a 3D printer, the number of carbon atoms in the cyclic diol is preferably 6 or more; and from the same viewpoints, it is preferably 31 or less, more preferably 30 or less, and further preferably 27 or less.

The diol C may have ether oxygen. However, if the diol C is a chain aliphatic diol, from the viewpoints of the solubility into neutral water, moisture absorption resistance, and heat resistance required for modeling by a 3D printer, the number of the ether oxygen is preferably 1 or less; and if the diol C is a cyclic aliphatic diol, from the same viewpoints, the number of the ether oxygen is preferably 2 or less.

From the viewpoints of the solubility into neutral water, moisture absorption resistance, and heat resistance required for modeling by a 3D printer, the chain diol is preferably at least one type selected from the group consisting of ethylene glycol, 1,2-propanediol, 1,3-propanediol, diethylene glycol, and dipropylene glycol; and more preferably at least one type selected from the group consisting of ethylene glycol, 1,2-propaneediol, and 1,3-propanediol. Among these, diethylene glycol and dipropylene glycol may be prepared as a raw material for polymerization or may be generated during the polymerization.

If the diol C contains diethylene glycol, from the viewpoints of the solubility into neutral water, moisture absorption resistance, and heat resistance required for modeling by a 3D printer, the ratio of diethylene glycol to the total amount of all diol monomer units in the polyester resin is preferably 5 mol % or more, more preferably 10 mol % or more, further preferably 15 mol % or more, further more preferably 20 mol % or more, especially preferably 25 mold or more, more especially preferably 30 mol % or more; and preferably 60 mol % or less, more preferably 55 mol % or less, further preferably 50 mol % or less, and further preferably 45 mol % or less.

From the viewpoints of the solubility into neutral water, moisture absorption resistance, and heat resistance required for modeling by a 3D printer, the cyclic diol is preferably at least one type selected from the group consisting of 1,4-cyclohexane dimethanol, hydrogenated bisphenol A, isosorbide, bisphenoxyethanolfluorene, bisphenolfluorene, biscresoxyethanolfluorene, and biscresolfluorene.

If the diol C is at least one type selected from the group consisting of ethylene glycol, 1,2-propanediol, 1,3-propanediol, diethylene glycol, dipropylene glycol, 1,4-cyclohexane dimethanol, hydrogenated bisphenol A, isosorbide, bisphenoxyethanolfluorene, bisphenolfluorene, biscresoxyethanolfluorenem and biscresolfluorene; from the viewpoints of the solubility into neutral water, moisture absorption resistance, and heat resistance required for modeling by a 3D printer; the ratio of the total amount of ethylene glycol, 1,2-propanediol, 1,3-propanediol, diethylene glycol, dipropylene glycol, 1,4-cyclohexane dimethanol, hydrogenated bisphenol A, isosorbide, bisphenoxyethanolfluorene, bisphenolfluorene, biscresoxyethanolfluorene and biscresolfluorene to the total amount of all diol monomer units in the polyester resin is preferably 80 mol % or more, more preferably 90 mol % or more, further preferably 95 mol % or more, further more preferably 98 mol % or more, especially preferably substantially 100 mol %, and more especially preferably 100 mol %.

The polyester resin is preferably the following resin from the viewpoints of the solubility into neutral water, moisture absorption resistance, and heat resistance required for modeling by a 3D printer: a polyester resin α in which the ratio of the hydrophilic monomer unit $A_1$ in the total of all dicarboxylic acid monomer units, which include the hydrophilic monomer unit $A_1$, is 10 mol % to 70 mol %; the ratio of the dicarboxylic acid monomer units $B_1$ in the same total is 30 mol % to 90 mol %; and the dicarboxylic acid $B_1$ for obtaining the dicarboxylic acid monomer units 131 is 2,6-naphthalene dicarboxylic acid.

(Polyester Resin α)

From the viewpoints of the solubility into neutral water, moisture absorption resistance, and heat resistance required for modeling by a 3D printer; the ratio of the hydrophilic monomer unit $A_1$ to the total amount of all dicarboxylic acid monomer units including the hydrophilic monomer unit $A_1$ in the polyester resin a is preferably 10 mol % or more and more preferably 20 mol % or more; and from the same viewpoints, it is preferably 70 mol % or less, more preferably 65 mol % or less, further preferably 60 mol % or less, further more preferably 40 mol % or less, and further more preferably 27 mol % or less.

From the viewpoints of the solubility into neutral water, moisture absorption resistance, and heat resistance required for modeling by a 3D printer; the ratio of the dicarboxylic acid monomer unit $B_1$ to the total amount of all dicarboxylic acid monomer units including the hydrophilic monomer unit $A_1$ in the polyester resin α is preferably 30 mol % or more, more preferably 35 mol % or more, further preferably 40 mol % or more, further more preferably 65 mol % or more, and further more preferably 73 mol % or more; and from the same viewpoints, it is preferably 90 mol % or less and more preferably 80 mol % or less.

From the viewpoints of the solubility into neutral water, moisture absorption resistance, and heat resistance required for modeling by a 3D printer; the monomer $A_1$ in the polyester resin α is at least one type selected from the group consisting of 5-sulfoisophthalic acid and 2-sulfoisophthalic acid and more preferably 5-sulfoisophthalic acid.

From the viewpoints of the solubility into neutral water, moisture absorption resistance, and heat resistance required for modeling by a 3D printer, the diol C in the polyester resin α is preferably at least one type selected from the group consisting of ethylene glycol, 1,2-propanediol, diethylene glycol, 1,3-propanediol, dipropylene glycol, 1,4-cyclohexane dimethanol, hydrogenated bisphenol A, isosorbide, bisphenoxyethanolfluorene, bisphenolfluorene, biscresoxyethanolfluorene, and biscresolfluorene; and more preferably at least one type selected from the group consisting of ethylene glycol, diethylene glycol, 1,4-cyclohexane dimethanol, hydrogenated bisphenol A, isosorbide, and bisphenoxyethanolfluorene.

Examples of the polyester resin a can be shown by the following formulas (II) and (III).

[Formula 1]

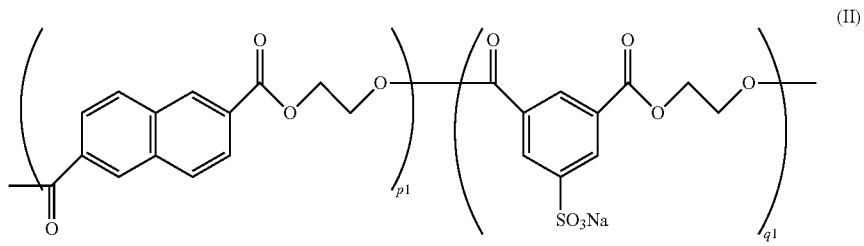

(II)

(In the formula (II), p1 represents the number-average degree of polymerization of ethylene 2,6-naphthalene dicarboxylate, and q1 represents the number-average degree of polymerization of ethylene 5-sulfoisophthalate. However, ethylene 2,6-naphthalene dicarboxylate and ethylene 5-sulfoisophthalate are a block copolymer and/or a random copolymer; and from a viewpoint of the solubility into neutral water, they preferably are a random copolymer.)

[Formula 2]

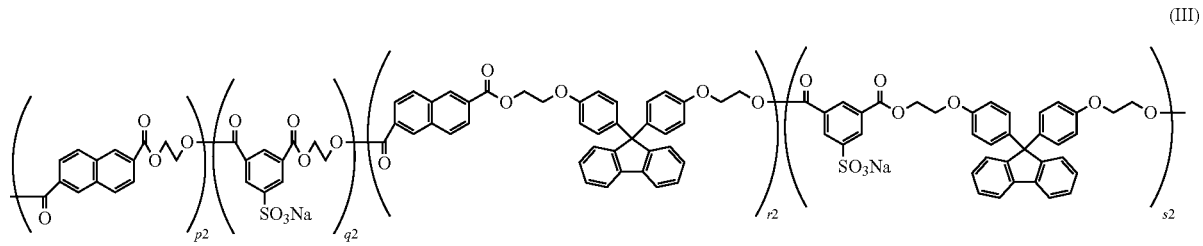

(III)

(In the formula (III), p2 represents the number-average degree of polymerization of ethylene 2,6-naphthalene dicarboxylate, q2 represents the number-average degree of polymerization of ethylene 5-sulfoisophthalate, r2 represents the number-average degree of polymerization of a condensate of bisphenoxyethanolfluorene and 2,6-naphthalene dicarboxylate, and s2 represents the number-average degree of polymerization of a condensate of bisphenoxyethanolfluorene and 5-sulfoisophthalate. However, ethylene 2,6-naphthalene dicarboxylate, ethylene 5-sulfoisophthalate, a condensate of bisphenoxyethanolfluorene and 2,6-naphthalene dicarboxylate, and a condensate of bisphenoxyethanolfluorene and 5-sulfoisophthalate are polymerized to form a block copolymer and/or a random copolymer; and from a viewpoint of the solubility into neutral water, they are polymerized to form a random copolymer.)

The polyester resin may have monomer unit other than the hydrophilic monomer unit $A_1$, the dicarboxylic acid monomer unit $B_1$, and diol monomer unit as long as the effect of the present embodiment is not impaired.

The method for manufacturing the polyester resin is not particularly limited and a conventionally known method for manufacturing a polyester resin can be applied.

[Polyamide Resin having Hydrophilic Group]

An example of the polyamide resin is a polyamide resin having a hydrophilic monomer unit $A_2$ having a hydrophilic group, a hydrophobic dicarboxylic acid monomer unit $B_2$, and a hydrophobic diamine monomer unit, in which the ratio of the hydrophilic monomer unit $A_2$ to the total amount of all monomer units in the polyamide resin is 2.5 mol % to 40 mol %.

[Hydrophilic Monomer Unit $A_2$]

The polyamide resin has a hydrophilic monomer unit $A_2$ having a hydrophilic group. The hydrophilic monomer unit $A_2$ is not particularly limited as long as it is a monomer unit having a hydrophilic group. A monomer for deriving the hydrophilic monomer unit $A_2$ is also referred to as a monomer $A_2$.

From a viewpoint of the solubility into neutral water and a viewpoint of the easiness of the polymerization when producing the polyamide resin, examples of the hydrophilic group are at least one type selected from the group consisting of a primary amino group, a secondary amino group, a tertiary amino group, a quaternary ammonium salt group, an oxyethylene group, a hydroxyl group, a carboxyl group, a carboxyl salt group, a phosphoric acid group, a phosphate group, a sulfonic acid group, and a sulfonate group.

From a viewpoint of the solubility into neutral water and a viewpoint of the easiness of the polymerization when producing the polyamide resin, the secondary amino group is preferably at least one type selected from the group consisting of a secondary amino group represented by —$NHR^{10}$ ($R^{10}$ represents a straight chain or branched alkyl group having 1 to 14 carbon atoms) and a secondary amino group represented by —NH—.

From a viewpoint of the solubility into neutral water and a viewpoint of the easiness of the polymerization when producing the polyamide resin, the tertiary amino group is preferably at least one type selected from the group consisting of a tertiary amino group represented by —$NR^{11}R^{12}$ ($R^{11}$ represents a straight chain or branched alkyl group having 1 to 14 carbon atoms and $R^{12}$ represents a straight chain or branched alkyl group having 1 to 14 carbon atoms) and a tertiary amino group represented by —$NR^{13}$— ($R^{13}$ represents a straight chain or branched alkyl group having 1 to 14 carbon atoms).

From a viewpoint of the solubility into neutral water and a viewpoint of the easiness of the polymerization when producing the polyamide resin, the quaternary ammonium salt group is preferably at least one type selected from the group consisting of a quaternary ammonium salt group represented by —$N^+\{R^{14}R^{15}R^{16}\}\cdot X^-$ (Each of $R^{14}$, $R^{15}$, and $R^{16}$ represents a hydrogen atom or an alkyl group having 1 to 14 carbon atoms and $X^-$ represents a hydroxy ion, a halogen ion, $CH_3SO_4^-$, or $CH_3CH_2SO_4^-$).

From a viewpoint of the solubility into neutral water and a viewpoint of the easiness of the polymerization when producing the polyamide resin, the oxyethylene group is preferably at least one type selected from the group consisting of an oxyethylene group represented by —$\{CH_2CH_2O\}_{j2}$— (j2 represents an average number and it is an integer of 1 to 2,500, preferably 2 to 1,000, more preferably 3 to 100, and further preferably 4 to 50) and an oxyethylene group represented by —$\{CH_2CH_2O\}_{m2}$—$R^{17}$ (m2 represents an average number and it is an integer of 1 to 2,500, preferably 2 to 1,000, more preferably 3 to 100, and further preferably 4 to 50. $R^{17}$ represents a hydrogen atom or a straight chain or branched alkyl group having 1 to 10 carbon atoms and it is more preferably 2 to 6 and further preferably 3 to 5).

From a viewpoint of the solubility into neutral water and a viewpoint of the easiness of the polymerization when producing the polyamide resin, the carboxyl salt group is preferably a carboxyl salt group represented by —$COOM^4$ ($M^4$ represents a counterion of a carboxyl group constituting the carboxyl salt group; and from a viewpoint of the solubility into neutral water, it is preferably at least one type selected from the group consisting of a sodium ion, a potassium ion, a lithium ion, calcium ion, a magnesium ion, an ammonium ion, a barium ion, and a zinc ion; more preferably at least one type selected from the group consisting of a sodium ion, a potassium ion, a lithium ion, a magnesium ion, and an ammonium ion; further preferably at least one type selected from the group consisting of a sodium ion and a potassium ion; and further more preferably a sodium ion).

From a viewpoint of the solubility into neutral water and a viewpoint of the easiness of the polymerization when producing the polyamide resin, the phosphate group is preferably at least one type selected from the group consisting of a phosphate group represented by —$PO_4M^5_2$, —$PO_4HM^5$, and —$PO_4M^5$ ($M^5$ represents a counterion of a phosphoric acid group constituting the phosphate group; and from a viewpoint of the solubility into neutral water, it is preferably at least one type selected from the group consisting of a sodium ion, a potassium ion, a lithium ion, calcium ion, a magnesium ion, an ammonium ion, a barium ion, and a zinc ion; more preferably at least one type selected from the group consisting of a sodium ion, a potassium ion, a lithium ion, a magnesium ion, and an ammonium ion; further preferably at least one type selected from the group consisting of a sodium ion and a potassium ion; and further more preferably a sodium ion).

From a viewpoint of the solubility into neutral water and a viewpoint of the easiness of the polymerization when producing the polyamide resin, the sulfonate group is preferably a sulfonate group represented by —$SO_3M^6$ ($M^6$ represents a counterion of a sulfonic acid group constituting the sulfonate group; and from a viewpoint of the solubility into neutral water, it is preferably at least one type selected from the group consisting of a sodium ion, a potassium ion, a lithium ion, calcium ion, a magnesium ion, an ammonium ion, a barium ion, and a zinc ion; more preferably at least one type selected from the group consisting of a sodium ion, a potassium ion, a lithium ion, a magnesium ion, and an ammonium ion; further preferably at least one type selected from the group consisting of a sodium ion and a potassium ion; and further more preferably a sodium ion).

From a viewpoint of the solubility into neutral water, a viewpoint of moisture absorption resistance, a viewpoint of heat resistance required for modeling by a 3D printer, and a viewpoint of the easiness of the polymerization when producing the polyamide resin, the monomer $A_2$ is preferably at least one type selected from the group consisting of carboxylic acid, amine, and amino acid, and more preferably carboxylic acid. Among the type of carboxylic acid, from the same viewpoints, aromatic carboxylic acid is preferable; and at least one type selected from the group consisting of hydroxy group-containing aromatic dicarboxylic acid, primary amino group-containing aromatic dicarboxylic acid, sulfonic acid group-containing aromatic dicarboxylic acid, and sulfonate group-containing aromatic dicarboxylic acid are more preferable. Among those, from the same viewpoints, at least one type selected from the group consisting of 5-hydroxyisophthalic acid, 1,3,5-benzene tricarboxylic acid, 5-aminoisophthalic acid, 5-sulfoisophthalic acid, 2-sulfoterephthalic acid, and 4-sulfo-2,6-naphthalene dicarboxylic acid are preferable; at least one type selected from the group consisting of 5-sulfoisophthalic acid and 2-sulfoterephthalic acid are more preferable; and 5-sulfoisophthalic acid is further preferable.

From a viewpoint of the solubility into neutral water, the content of the hydrophilic group in the polyamide resin is preferably 0.5 mmol/g or more, more preferably 0.6 mmol/g or more, and further preferably 0.7 mmol/g or more; and from a viewpoint of moisture absorption resistance, it is preferably 3.0 mmol/g or less, more preferably 2.0 mmol/g or less, and further preferably 1.5 mmol/g or less. From the viewpoint of the solubility into neutral water and the viewpoint of moisture absorption resistance, the content of the hydrophilic group in the polyamide resin is preferably 0.5 mmol/g to 3.0 mmol/g, more preferably 0.6 mmol/g to 2.0 mmol/g, and further preferably 0.7 mmol/g to 1.5 mmol/g.

From a viewpoint of the solubility into neutral water, the ratio of the amount of the hydrophilic monomer unit $A_2$ to the total amount of monomer units in the polyamide resin is 2.5 mol % or more, preferably 4 mol % or more, more preferably 6 mol % or more, further preferably 8 mol % or more, and further more preferably 10 mol % or more; and from a viewpoint of moisture absorption resistance, it is 40 mol % or less, preferably 35 mol % or less, more preferably 31 mol % or less, further preferably 25 mol % or less, further more preferably 20 mol % or less, especially preferably 15 mol % or less, more especially preferably 10 mol % or less, and more especially preferably 8 mol % or less. From the viewpoint of the solubility into neutral water and from the viewpoint of moisture absorption resistance, the ratio of the amount of the hydrophilic monomer unit $A_2$ to the total amount of monomer units in the polyamide resin is preferably 2.5 mol % to 40 mol %, more preferably 4 mol % to 35 mol %, further preferably 6 mol % to 31 mol %, further more preferably 8 mol % to 20 mol %, especially preferably 8 mol % to 15 mol %, and more especially preferably 8 mol % to 12 mol %.

[Hydrophobic Dicarboxylic Acid Monomer Unit $B_2$]

The polyamide resin has a hydrophobic dicarboxylic acid monomer unit $B_2$. The dicarboxylic acid monomer unit $B_2$ does not have a hydrophilic group. In the present specification, dicarboxylic acid for deriving the hydrophobic dicarboxylic acid monomer unit $B_2$ is also referred to as dicarboxylic acid $B_2$.

The dicarboxylic acid $B_2$ is not particularly limited as long as it is dicarboxylic acid. However, from a viewpoint of the solubility into neutral water, a viewpoint of moisture absorption resistance, a viewpoint of heat resistance required for modeling by a 3D printer, and a viewpoint of the easiness of the polymerization when producing the polyamide resin, the dicarboxylic acid $B_2$ is preferably at least one type selected from the group consisting of aromatic dicarboxylic acid, aliphatic dicarboxylic acid, and alicyclic dicarboxylic acid. Among these, from the same viewpoints, at least one type selected from the group consisting of terephthalic acid, isophthalic acid, 2,5-furan dicarboxylic acid, 2,6-naphthalene dicarboxylic acid, 1,4-cyclohexane dicarboxylic acid, and 1,3-adamantane dicarboxylic acid are more preferable; and at least one type selected from the group consisting of terephthalic acid, 2,5-furan dicarboxylic acid, and 2,6-naphthalene dicarboxylic acid are further preferable; terephthalic acid is further more preferable.

From a viewpoint of moisture absorption resistance, the ratio of the amount of the hydrophobic dicarboxylic acid monomer unit $B_2$ in the polyamide resin to the total amount of monomer units in the polyamide resin is preferably 10 mol % or more, more preferably 20 mol % or more, further preferably 30 mol % or more, further more preferably 35 mol % or more, especially preferably 40 mol % or more, and more especially preferably 42 mol % or more; and from a viewpoint of the solubility into neutral water, it is preferably 47.5 mol % or less, more preferably 45 mol % or less, further preferably 42 mol % or less, and further more preferably 40 mol % or less. From the viewpoint of moisture absorption resistance and the viewpoint of the solubility into neutral water, the ratio of the amount of the hydrophobic dicarboxylic acid monomer unit $B_2$ in the polyamide resin to the total amount of monomer units in the polyamide resin is preferably 10 mol % to 47.5 mol %, more preferably 20 mol % to 45 mol %, and further preferably 30 mol % to 42 mol %.

From the viewpoints of the solubility into neutral water, moisture absorption resistance, and heat resistance required for modeling by a 3D printer, the mole ratio of the hydrophilic monomer unit $A_2$ to the hydrophobic dicarboxylic acid monomer unit $B_2$ (hydrophilic monomer unit $A_2$/hydrophobic dicarboxylic acid monomer unit $B_2$) is preferably 10/90 or more, more preferably 15/85 or more, further preferably 18/82 or more, and further more preferably 20/80 or more; and from the same viewpoints, it is preferably 50/50 or less, more preferably 40/60 or less, further preferably 30/70 or less, and further more preferably 25/75 or less.

[Hydrophobic Diamine Monomer Unit]

The polyamide resin has a hydrophobic diamine monomer unit. The hydrophobic diamine monomer unit does not have a hydrophilic group. The diamine for deriving the hydrophobic diamine monomer unit is also referred to as diamine C.

The diamine C is not particularly limited, and at least one type selected from the group consisting of aliphatic diamine, alicyclic diamine, and aromatic diamine can be used. However, from a viewpoint of the easiness of the polymerization when producing the polyamide resin, the diamine C is preferably aliphatic diamine.

From the viewpoints of the solubility into neutral water, moisture absorption resistance, heat resistance required for modeling by a 3D printer, and easiness of the polymerization when producing the polyamide resin, the number of carbon atoms in the diamine C is preferably 2 or more, more preferably 3 or more, and further preferably 4 or more; and from the viewpoints of the solubility into neutral water, moisture absorption resistance, and heat resistance required for modeling by a 3D printer, it is preferably 20 or less, more preferably 15 or less, and further preferably 10 or less.

Examples of the aliphatic diamine include ethylenediamine, trimethylenediamine, tetramethylenediamine, pentamethylenediamine, hexamethylenediamine, heptamethylenediamine, octamethylenediamine, nonanediamine, and decanediamine. Among these, from the viewpoints of the solubility into neutral water, moisture absorption resistance, and toughness (strength) required for modeling by a 3D printer, hexamethylenediamine is preferable.

Examples of the alicyclic diamine include 4,4'-diamino-3,3'-dimethyldicyclohexylmethane, diamine cyclohexane, and isophoronediamine. Among these, from the viewpoints of the solubility into neutral water, moisture absorption resistance, and toughness (strength) required for modeling by a 3D printer, at least one type selected from the group consisting of diaminecyclohexane and isophoronediamine is preferable and at least one type selected from the group consisting of diaminecyclohexane is more preferable.

Examples of the aromatic diamine include phenylene diamine, diethyltoluenediamine, and 4,4'-diaminodiphenylmethane. Among these, from the viewpoints of the solubility into neutral water, moisture absorption resistance, and toughness (strength) required for modeling by a 3D printer, at least one type selected from the group consisting of phenylene diamine and diethyltoluenediamine is preferable and at least one type selected from the group consisting of phenylenediamine is more preferable.

From the viewpoints of the solubility into neutral water, moisture absorption resistance, and toughness (strength) required for modeling by a 3D printer, the diamine C is preferably at least one type selected from the group consisting of hexamethylenediamine, diaminecyclohexane, and phenylenediamine, more preferably at least one type selected from the group consisting of hexamethylenediamine and phenylenediamine, and further preferably hexamethylene diamine.

If the diamine C is at least one type selected from the group consisting of hexamethylenediamine, diaminecyclohexane, and phenylenediamine; from the viewpoints of the solubility into neutral water, moisture absorption resistance, and heat resistance required for modeling by a 3D printer; the ratio of the total amount of hexamethylenediamine, diaminecyclohexane, and phenylenediamine to the total amount of all diamine monomer units in the polyamide resin is preferably 50 mol % or more, more preferably 70 mol % or more, further preferably 80 mol % or more, further more preferably 90 mol % or more, especially preferably substantially 100 mol %, and more especially preferably 100 mold. "Substantially 100 mol %" means that a case is included in which substances other than hexamethylenediamine, diaminecyclohexane, and phenylenediamine are inevitably mixed in the diamine C.

Examples of the polyamide resin can be shown in the following formulas (IV) to (IX).

[Formula 3]

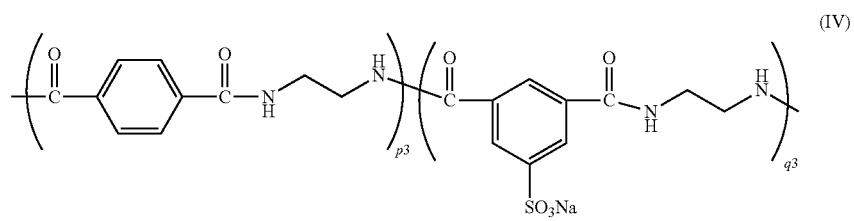

(In the formula (IV), p3 and q3 represent the number-average degree of polymerization respectively. The polymer may be a block copolymer or a random copolymer; and from a viewpoint of the solubility into neutral water, the polymer is preferably a random copolymer.)

[Formula 4]

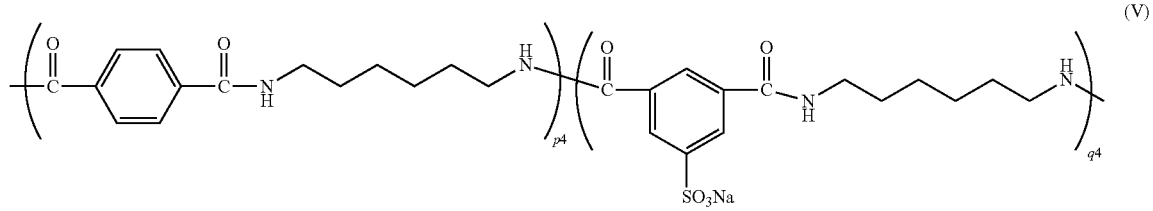

(In the formula (V), p4 and q4 represent the number-average degree of polymerization respectively. The polymer may be a block copolymer or a random copolymer; and from a viewpoint of the solubility into neutral water, the polymer is preferably a random copolymer.)

[Formula 5]

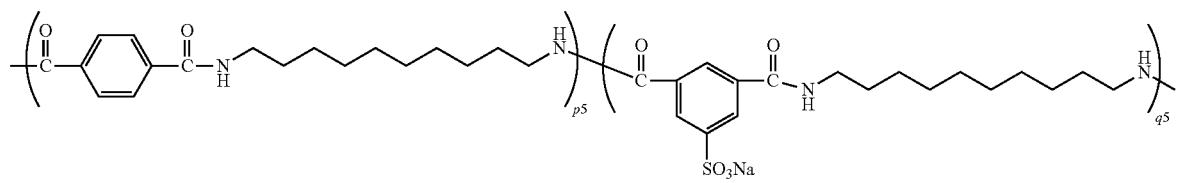

(VI)

(In the formula (VI), p5 and q5 represent the number-average degree of polymerization respectively. The polymer may be a block copolymer or a random copolymer; and from a viewpoint of the solubility into neutral water, the polymer is preferably a random copolymer.)

[Formula 6]

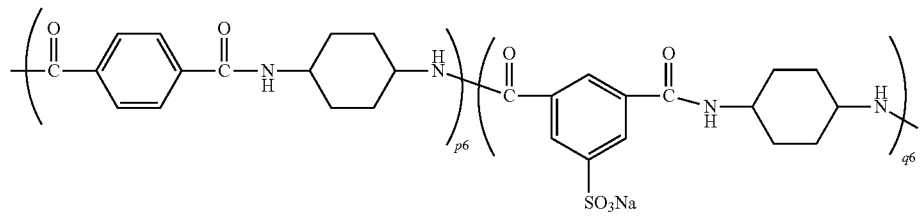

(VII)

(In the formula (VII), p6 and q6 represent the number-average degree of polymerization respectively. The polymer may be a block copolymer or a random copolymer; and from a viewpoint of the solubility into neutral water, the polymer is preferably a random copolymer.)

[Formula 7]

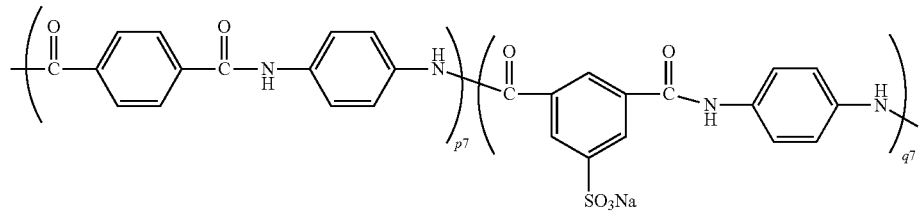

(VIII)

(In the formula (VIII), p7 and q7 represent the number-average degree of polymerization respectively. The polymer may be a block copolymer or a random copolymer; and from a viewpoint of the solubility into neutral water, the polymer is preferably a random copolymer.)

[Formula 8]

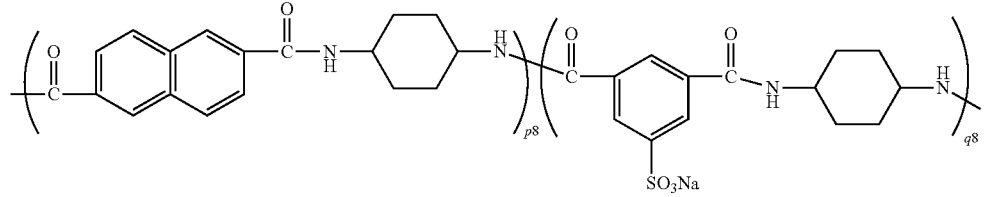

(IX)

(In the formula (IX), p8 and q8 represent the number-average degree of polymerization respectively. The polymer may be a block copolymer or a random copolymer; and from a viewpoint of the solubility into neutral water, the polymer is preferably a random copolymer.)

The polyamide resin may have monomer unit other than the monomer unit $A_2$, the dicarboxylic acid monomer unit $B_2$, and the hydrophobic diamine monomer unit as long as the effect of the present embodiment is not impaired.

The method for manufacturing the polyamide resin is not particularly limited and a conventionally known method for manufacturing a polyamide resin can be applied.

From a viewpoint of improving the toughness required for a soluble material for three-dimensional modeling, the weight average molecular weight of the thermoplastic resin is preferably 3,000 or more, more preferably 3,500 or more, further preferably 4,000 or more; and from the viewpoints of solubility into neutral water and the modeling property by a 3D printer, the weight average molecular weight of the thermoplastic resin is preferably 70,000 or less, more preferably 50,000 or less, further preferably 30,000 or less, and further more preferably 20,000 or less. In the present specification, the weight average molecular weight is obtained with a method described in the example.

From the viewpoint of modeling properties by a 3D printer, the glass transition temperature (Tg) of the thermoplastic resin is preferably 50° C. or higher, more preferably 60° C. or higher, further preferably 70° C. or higher, and even more preferably 80° C. or higher; and from the same viewpoint, the glass transition temperature is preferably 250° C. or lower, more preferably 220° C. or lower, further preferably 180° C. or lower, further more preferably 160° C. or lower, further more preferably 140° C. or lower, and further more preferably 120° C. or lower. Herein, the glass transition temperature is measured by the method described in the examples.

From a viewpoint of the modeling property by a 3D printer, the content of the thermoplastic resin in the soluble material for three-dimensional modeling is preferably 70% by mass or more, and more preferably 80% by mass or more; and preferably 95% by mass or less, and more preferably 90% by mass or less.

[Organic Salt Compound]

The soluble material for three-dimensional modeling contains the organic salt compound represented by the general formula (I), from a viewpoint of improving the adhesive properties to a modeling material.

In the general formula (I), $R^1$ represents a hydrocarbon group that optionally has a substituent group and that has 1 to 30 carbon atoms, from a viewpoint of improving the adhesive properties to a modeling material, a viewpoint of the dissolubility to neutral water, a viewpoint of the moisture absorption resistance, and a viewpoint of the heat resistance required for modeling by a 3D printer. The hydrocarbon group may be any one of an aliphatic hydrocarbon group, an alicyclic hydrocarbon group, and an aromatic hydrocarbon group. When being an aliphatic hydrocarbon group, the hydrocarbon group has preferably 1 or more carbon atoms, more preferably 4 or more carbon atoms, further preferably 8 or more carbon atoms and preferably 30 or less carbon atoms, more preferably 25 or less carbon atoms, further preferably 20 or less carbon atoms, from a viewpoint of improving the adhesive properties to a modeling material, a viewpoint of the dissolubility to neutral water, a viewpoint of the moisture absorption resistance, and a viewpoint of the heat resistance required for modeling by a 3D printer. When being an alicyclic hydrocarbon group, the hydrocarbon group has preferably 3 or more carbon atoms, more preferably 5 or more carbon atoms, further preferably 6 or more carbon atoms, furthermore preferably 10 or more carbon atoms and preferably 30 or less carbon atoms, more preferably 25 or less carbon atoms, further preferably 20 or less carbon atoms, from a viewpoint of improving the adhesive properties to a modeling material, a viewpoint of the dissolubility to neutral water, a viewpoint of the moisture absorption resistance, and a viewpoint of the heat resistance required for modeling by a 3D printer. When being an aromatic hydrocarbon group, the hydrocarbon group has preferably 6 or more carbon atoms, more preferably 8 or more carbon atoms, further preferably 10 or more carbon atoms and preferably 30 or less carbon atoms, more preferably 25 or less carbon atoms, from a viewpoint of improving the adhesive properties to a modeling material, a viewpoint of the dissolubility to neutral water, a viewpoint of the moisture absorption resistance, and a viewpoint of the heat resistance required for modeling by a 3D printer.

The substituent group is preferably one containing at least one type selected from the group consisting of a hydrogen atom, a carbon atom, an oxygen atom, a nitrogen atom, a sulfur atom, a phosphorus atom, a silicon atom, and a halogen atom, from a viewpoint of improving the adhesive properties to a modeling material, a viewpoint of the dissolubility to neutral water, a viewpoint of the moisture absorption resistance, and a viewpoint of the heat resistance required for modeling by a 3D printer. Particularly, the substituent group is preferably a hydrocarbon group or an alkyl halide group having 1 to 22 carbon atoms, more preferably a hydrocarbon group or an alkyl halide group having 1 to 16 carbon atoms, further preferably a hydrocarbon group or an alkyl halide group having 1 to 12 carbon atoms, furthermore preferably a hydrocarbon group having 1 to 12 carbon atoms.

In the general formula (I), $X^{n+}$ represents a sodium ion, a potassium ion, a lithium ion, an ammonium ion, a phosphonium ion, a magnesium ion, a calcium ion, a barium ion, a zinc ion, or a phosphonium ion, is preferably a sodium ion, a potassium ion, a lithium ion, a magnesium ion, an ammonium ion, or a phosphonium ion, is more preferably a sodium ion, a lithium ion, an ammonium ion, or a phosphonium ion, is further preferably a lithium ion or a phosphonium ion, and is furthermore preferably a phosphonium ion, from a viewpoint of improving the adhesive properties to a modeling material, a viewpoint of the dissolubility to neutral water, a viewpoint of the moisture absorption resistance, and a viewpoint of the heat resistance required for modeling by a 3D printer. Particularly, the phosphonium ion is preferably a tetraalkylphosphonium ion, more preferably a tetrabutylphosphonium ion, from a viewpoint of improving the adhesive properties to a modeling material, a viewpoint of the dissolubility to neutral water, a viewpoint of the moisture absorption resistance, and a viewpoint of the heat resistance required for modeling by a 3D printer.

In the general formula (I), n is preferably 1 from a viewpoint of improving the adhesive properties to a modeling material, a viewpoint of the dissolubility to neutral water, a viewpoint of the moisture absorption resistance, and a viewpoint of the heat resistance required for modeling by a 3D printer.

A mass ratio of the organic salt compound to the thermoplastic resin is preferably 0.5 or more, more preferably 2 or more, further preferably 6 or more, from a viewpoint of improving the adhesive properties to a modeling material. The mass ratio is preferably 30 or less, more preferably 20 or less, further preferably 15 or less, from a viewpoint of the dissolubility to neutral water, a viewpoint of the moisture absorption resistance, and a viewpoint of the heat resistance required for modeling by a 3D printer.

A ratio of an amount (mol) of an alkyl sulfonic acid ion ($R^1$—$SO_3^-$) in the organic salt compound to an amount (mol) of the hydrophilic group in the thermoplastic resin (an amount of an alkyl sulfonic acid ion in the organic salt compound/an amount of the hydrophilic group in the thermoplastic resin) is preferably 0.005 or more, more preferably 0.01 or more, further preferably 0.05 or more, furthermore preferably 0.15 or more, from a viewpoint of improving the adhesive properties to a modeling material. The ratio is preferably 1.0 or less, more preferably 0.9 or less, further preferably 0.7 or less, from a viewpoint of the dissolubility to neutral water, a viewpoint of the moisture absorption resistance, and a viewpoint of the heat resistance required for modeling by a 3D printer.

From a viewpoint of the modeling property by a 3D printer, the glass transition temperature of the soluble material for three-dimensional modeling is preferably 50° C. or higher, more preferably 60° C. or higher, further preferably 70° C. or higher, and further more preferably 80° C. or higher; and from the same viewpoint, the glass transition temperature of the soluble material for three-dimensional modeling is preferably 250° C. or lower, more preferably 220° C. or lower, and further preferably 200° C. or lower.

The soluble material for three-dimensional modeling may include a component different from the above-mentioned components as far as the advantageous effects of the present embodiment are not damaged. Examples of the different component include polymers other than the thermoplastic resin, a plasticizer such as any polyalkylene glycol diester of benzoic acid; fillers such as calcium carbonate, magnesium carbonate, glass spheres, graphite, carbon black, carbon fiber, glass fiber, talc, wollastonite, mica, alumina, silica, kaolin, whisker, and silicon carbide; compatibilizers; elastomers.

The method for manufacturing the soluble material for three-dimensional modeling is not particularly limited, and a conventionally known method for manufacturing a soluble material for three-dimensional modeling can be adopted. As an example of the manufacturing method of the soluble material for three-dimensional formation, there is a method of manufacturing by kneading raw materials with a kneader such as a batch type kneader or a twin screw extruder.

The form of the soluble material for three-dimensional modeling is not particularly limited, and examples of the form include a pellet, powder, and a filament. However, from a viewpoint of the modeling property by a 3D printer, a filament is preferable.

From a viewpoint of the modeling property by a 3D printer and a viewpoint of improving the modeling accuracy of a three-dimensional object, the diameter of the filament is preferably 0.5 mm or more, and more preferably 1.0 mm or more; from the same viewpoints, the diameter of the filament is preferably 3.0 mm or less, more preferably 2.0 mm or less, and further preferably 1.8 mm or less. From a viewpoint of enhancing the toughness, a drawing process is preferably performed to produce a filament. From a viewpoint of improving the toughness while maintaining solubility, the draw ratio is preferably 1.5 times or more, more preferably 2 times or more, further preferably 3 times or more, further more preferably 5 times or more; and from the same viewpoint, the draw ratio is preferably 200 times or less, more preferably 150 times or less, further preferably 100 times or less, and further more preferably 50 times or less. The drawing temperature is preferably in a range of a temperature from 20° C. lower than the glass transition temperature of the soluble material for three-dimensional modeling to 110° C. higher than the glass transition temperature. From a viewpoint of improving the toughness and a viewpoint of thermal stability, the lower limit of the drawing temperature is more preferably 10° C. lower than the glass transition temperature, and further preferably same as the glass transition temperature. From the same viewpoints, the upper limit of the drawing temperature is more preferably 110° C. higher than the glass transition temperature, further preferably 100° C. higher than the glass transition temperature, and further more preferably 90° C. higher than the glass transition temperature. The drawing may be performed while air cooling when the resin is discharged from the extruder or the resin may be heated by hot air or a laser. The drawing may be performed in one stage to a prescribed filament diameter at a prescribed draw ratio or multiple stages to a prescribed filament diameter at a prescribed draw ratio.

<Method for Manufacturing a Three-Dimensional Object>

A method for manufacturing a three-dimensional object according to the present embodiment is a method for manufacturing a three-dimensional object by a fused deposition modeling system, the method including a step of obtaining a precursor of the three-dimensional object containing the three-dimensional object and a support material; and a support material removing step of bringing the precursor of the three-dimensional object into contact with neutral water to remove the support material, in which a material of the support material is the soluble material for three-dimensional modeling. The method for manufacturing a three-dimensional object is capable of suppressing the degradation of the modeling accuracy of a three-dimensional object and has a high rate of dissolution to neutral water to be removable speedily from a precursor of the three-dimensional object without use of a strong alkaline aqueous solution.

[Step of Obtaining Precursor of Three-Dimensional Object Containing Three-Dimensional Object and Support Material]

As the step of obtaining a precursor of a three-dimensional object containing the three-dimensional object and the support material, a step of obtaining a precursor of a three-dimensional object containing the three-dimensional object and the support material of a known method for manufacturing a three-dimensional object with a fused deposition modeling type 3D printer can be used, except that the material of the support material is the soluble material for three-dimensional modeling.

The modeling material that is a material of the three-dimensional object is not particularly limited as long as the modeling material is a resin that can be used as a modeling material in the method for manufacturing a three-dimensional object of a conventional FDM system. Examples of the modeling material include thermoplastic resins such as an ABS resin, a PP resin, an ASA resin, a PS resin, a HIPS resin, a PVC resin, a polylactate resin, a polycarbonate resin, a polyamide resin, a polyetherimide resin, a polyetheretherketone resin, and a polyphenylsulfone resin. Among these, from a viewpoint of the modeling property by a 3D printer, at least one type selected from the group consisting of an ABS resin, a polylactate resin, a polycarbonate resin, and a polyamide resin are preferable, and at least one type selected from the group consisting of an ABS resin, a polycarbonate resin, and a polyamide resin are more preferable.

From the viewpoints of the modeling property by a 3D printer, the glass transition temperature of the support material used in the step of obtaining precursor of three-dimensional object is preferably from (the glass transition temperature of the modeling material to be used −20° C.) to (the glass transition temperature of the modeling material to be used +20° C.), more preferably from (the glass transition temperature of the modeling material to be used −15° C.) to (the glass transition temperature of the modeling material to be used +15° C.)

[Support Material Removing step of Bringing the Precursor of the Three-Dimensional Object into Contact with Neutral Water to Remove the Support Material]

The precursor of the three-dimensional object is made to contact a neutral water to remove the support material in the support material removing step. The method of making the precursor of the three-dimensional object contact the neutral water is preferably a method of soaking the precursor of the three-dimensional object in the neutral water from the viewpoints of cost and ease of work. From the viewpoint of improving removability of the support material, the precursor of the three-dimensional object is irradiated with ultrasonic waves while being soaked in the neutral water to promote dissolution of the support material.

[Neutral Water]

Examples of the neutral water include ion exchange water, pure water, tap water, and industrial water. From the viewpoint of economy, ion exchange water and tap water are preferred. The neutral water may contain a water-soluble organic solvent as far as the solvent does not damage the resultant modeled three-dimensional object. Examples of the water-soluble organic solvent include lower alcohols such as methanol, ethanol, and 2-propanol; glycol ethers such as propylene glycol monomethyl ether, ethylene glycol monoethyl ether, ethylene glycol mono-t-butyl ether, and diethylene glycol monobutyl ether; and ketones such as acetone, and methyl ethyl ketone. When the neutral water contains the water-soluble organic solvent, the content of the water-soluble organic solvent in the neutral water is preferably 0.1% or more by mass, more preferably 0.5% or more by mass, even more preferably 1% or more by mass, even more preferably 3% or more by mass, and is preferably 50% or less by mass, more preferably 40% or less by mass, further preferably 30% or less by mass, further more preferably 20% or less by mass.

The amount of the neutral water used is preferably 10 mass times or more, and more preferably 20 mass times or more the support material from the viewpoint of the solubility of the support material. The amount of the neutral water used is preferably 10,000 mass times or less, more preferably 5,000 mass times or less, further preferably 1,000 mass times or less, and further preferably 100 mass times or less the support material from the economic viewpoint.

The period over which the soluble material for three-dimensional modeling is caused to contact the neutral water is preferably 5 minutes or longer from the viewpoint of the removability of the support material, and is preferably 180 minutes or shorter, more preferably 120 minutes or shorter, even more preferably 90 minutes or shorter from the viewpoint of economy, and a decrease of damage which the three-dimensional object suffers through the contact of the object with the neutral water over a long period. The washing temperature, which depends on the species of the modeling material, is preferably 15° C. or higher, more preferably 25° C. or higher, even more preferably 30° C. or higher, even more preferably 40° C. or higher from the viewpoint of economy, the removability of the support material, and a decrease of damage which the three-dimensional object suffers. From the same viewpoint, the temperature is preferably 85° C. or lower, more preferably 70° C. or lower, even more preferably 60° C. or lower.

<Support Material>

The support material according to the present embodiment is a support material for supporting a three-dimensional object when the three-dimensional object is manufactured by a 3D printer of a fused deposition modeling system, the support material containing the thermoplastic resin having the hydrophilic group and the organic salt compound represented by the general formula (I). The support material has sufficient adhesive properties to a modeling material and has a high rate of dissolution to neutral water to be removable speedily from a precursor of the three-dimensional object without use of a strong alkaline aqueous solution.

With respect to the above-described embodiment, the present description further discloses the following composition and manufacturing method.

<1> A soluble material for three-dimensional modeling used as a material of a support material for supporting a three-dimensional object when the three-dimensional object is manufactured by a 3D printer of a fused deposition modeling system, the soluble material comprising a thermoplastic resin having a hydrophilic group and an organic salt compound represented by a general formula (I) below:

$$(R^1\text{—}SO_3^-)_n X^{n+} \tag{I}$$

wherein $R^1$ represents a hydrocarbon group that optionally has a substituent group and that has 1 to 30 carbon atoms; n represents a number of 1 or 2; when n is 1, $X^{n+}$ represents a sodium ion, a potassium ion, a lithium ion, an ammonium ion, or a phosphonium ion; and when n is 2, $X^{n+}$ represents a magnesium ion, a calcium ion, a barium ion, or a zinc ion.

<2> The soluble material for three-dimensional modeling according to <1>, wherein the hydrophilic group is preferably at least one type selected from the group consisting of a primary amino group, a secondary amino group, a tertiary amino group, a quaternary ammonium salt group, an oxyethylene group, a hydroxyl group, a carboxyl group, a carboxyl salt group, an amide group, a phosphoric acid group, a phosphate group, a sulfonic acid group, and a sulfonate group, more preferably at least one type selected from the group consisting of a sulfonic acid group, and a sulfonate group, and further preferably a sulfonate group.

<3> The soluble material for three-dimensional modeling according to <1> or <2>, wherein the content of the hydrophilic group in the thermoplastic resin is preferably 0.5 mmol/g or more, more preferably 0.6 mmol/g or more, and further preferably 0.7 mmol/g or more; preferably 3.0 mmol/g or less, more preferably 2.0 mmol/g or less, and further preferably 1.0 mmol/g or less; preferably 0.5 mmol/g to 3.0 mmol/g, more preferably 0.6 mmol/g to 2.0 mmol/g, and further preferably 0.7 mmol/g to 1.5 mmol/g.

<4> The soluble material for three-dimensional modeling according to any one of <1> to <3>, wherein the thermoplastic resin is preferably at least one type selected from the group consisting of a polyester resin, a polyamide resin, an acrylic resin, a polyvinyl alcohol resin, a polyvinyl pyrrolidone resin, an ester amide resin, and a urethane resin; more preferably at least one type selected from the group consisting of a polyester resin and a polyamide resin.

<5> The soluble material for three-dimensional modeling according to any one of <1> to <4>, wherein the polyester resin is preferably a polyester resin having a hydrophilic monomer unit $A_1$ having the hydrophilic group, a hydrophobic dicarboxylic acid monomer unit $B_1$, and a diol monomer unit; in which a ratio of the hydrophilic monomer unit $A_1$ to a total amount of the hydrophilic monomer unit $A_1$ having a hydrophilic group and the hydrophobic dicarboxylic acid monomer unit $B_1$ in the polyester resin is 10 mol % to 70 mol %.

<6> The soluble material for three-dimensional modeling according to <5>, wherein a monomer $A_1$ for deriving the hydrophilic monomer unit $A_1$ is preferably at least one type selected from the group consisting of hydroxy group-containing aromatic dicarboxylic acid, primary amino group-containing aromatic dicarboxylic acid, sulfonic acid group-containing aromatic dicarboxylic acid, and sulfonate group-containing aromatic dicarboxylic acid; more preferably at least one type selected from the group consisting of 5-hydroxyisophthalic acid, 1,3,5-benzene tricarboxylic acid, 5-aminoisophthalic acid, 5-sulfoisophthalic acid, 2-sulfoterephthalic acid, and 4-sulfo-2,6-naphthalene dicarboxylic acid; further preferably at least one type selected from the group consisting of 5-sulfoisophthalic acid and 2-sulfoterephthalic acid; and further more preferably 5-sulfoisophthalic acid.

<7> The soluble material for three-dimensional modeling according to any one of <4> to <6>, wherein the content of the hydrophilic group in the polyester resin is preferably 0.5 mmol/g or more, more preferably 0.6 mmol/g or more, and further preferably 0.7 mmol/g or more; preferably 3.0 mmol/g or less, more preferably 1.5 mmol/g or less, and further preferably 1.0 mmol/g or less; preferably 0.5 mmol/g to 3.0 mmol/g, more preferably 0.6 mmol/g to 1.5 mmol/g, and further preferably 0.7 mmol/g to 1.0 mmol/g.

<8> The soluble material for three-dimensional modeling according to any one of <5> to <7>, wherein the ratio of the amount of the hydrophilic monomer unit $A_1$ to the total amount of monomer units in the polyester resin is 5 mol % or more, preferably 7 mol % or more, more preferably 10 mol % or more, and further preferably 12 mol % or more; 35 mol % or less, preferably 33 mol % or less, more preferably 32 mol % or less, and further preferably 30 mol % or less; preferably 5 mol % to 35 mol %, more preferably 7 mol % to 33 mol %, further preferably 10 mol % to 32 mol %, and further more preferably 12 mol % to 30 mol %; further more preferably 8 mol % to 13 mol %.

<9> The soluble material for three-dimensional modeling according to any one of <5> to <8>, wherein a dicarboxylic acid $B_1$ for deriving the hydrophobic dicarboxylic acid monomer unit $B_1$ is preferably at least one type selected from the group consisting of aromatic dicarboxylic acid, aliphatic dicarboxylic acid, and alicyclic dicarboxylic acid: more preferably at least one type selected from the group consisting of terephthalic acid, isophthalic acid, 2,5-furan dicarboxylic acid, 2,6-naphthalene dicarboxylic acid, 1,4-cyclohexane dicarboxylic acid, and 1,3-adamantane dicarboxylic acid; further preferably at least one type selected from the group consisting of terephthalic acid, 2,5-furan dicarboxylic acid, and 2,6-naphthalene dicarboxylic acid; further more preferably 2,6-naphthalene dicarboxylic acid.

<10> The soluble material for three-dimensional modeling according to any one of <5> to <9>, wherein the ratio of the amount of the hydrophobic dicarboxylic acid monomer unit $B_1$ in the polyester resin to the total amount of monomer units in the polyester resin is preferably 15 mol % or more, more preferably 18 mol % or more, and further preferably 20 mol % or more; preferably 45 mol % or less, more preferably 42 mol % or less, and further preferably 40 mol % or less; preferably 15 mol % to 45 mol %, more preferably 20 mol % to 42 mol %, and further preferably 30 mol % to 40 mol %.

<11> The soluble material for three-dimensional modeling according to any one of <5> to <10>, wherein the mole ratio of the hydrophilic monomer unit $A_1$ to the hydrophobic dicarboxylic acid monomer unit $B_1$ (hydrophilic monomer unit $A_1$/hydrophobic dicarboxylic acid monomer unit Bd is preferably 10/90 or more, more preferably 15/85 or more, further preferably 18/82 or more, and further more preferably 20/80 or more; preferably 70/30 or less, more preferably 65/35 or less, further preferably 60/40 or less, further more preferably 40/60 or less, and further more preferably 26/74 or less.

<12> The soluble material for three-dimensional modeling according to any one of <5> to <11>, wherein the ratio of diethylene glycol to the total amount of all diol monomer units in the polyester resin is preferably 5 mol % or more, more preferably 10 mol % or more, further preferably 15 mol % or more, further more preferably 20 mol % or more, especially preferably 25 mol % or more, more especially preferably 30 mol % or more; and preferably 60 mol % or less, more preferably 55 mol % or less, further preferably 50 mol % or less, and further preferably 45 mol % or less.

<13> The soluble material for three-dimensional modeling according to any one of <5> to <12>, wherein the ratio of the total amount of ethylene glycol, 1,2-propanediol, 1,3-propanediol, diethylene glycol, dipropylene glycol, 1,4-cyclohexane dimethanol, hydrogenated bisphenol A, isosorbide, bisphenoxyethanolfluorene, bisphenolfluorene, biscresoxyethanolfluorene and biscresolfluorene to the total amount of all diol monomer units in the polyester resin is preferably 80 mol % or more, more preferably 90 mol % or more, further preferably 95 mol % or more, further more preferably 98 mol % or more, especially preferably substantially 100 mol %, and more especially preferably 100 mol %.

<14> The soluble material for three-dimensional modeling according to any one of <5> to <13>, wherein the polyester resin is preferably a polyester resin α in which the ratio of the hydrophilic monomer unit $A_1$ in the total of all dicarboxylic acid monomer units, which include the hydrophilic monomer unit $A_1$, is 10 mol % to 70 mol %; the ratio of the dicarboxylic acid monomer units $B_1$ in the same total is 30 mol % to 90 mol %; and the dicarboxylic acid $B_1$ for obtaining the dicarboxylic acid monomer units $B_1$ is 2,6-naphthalene dicarboxylic acid.

<15> The soluble material for three-dimensional modeling according to any one of <4> to <14>, wherein the polyamide resin has a hydrophilic monomer unit $A_2$ having a hydrophilic group, a hydrophobic dicarboxylic acid monomer unit $B_2$, and a hydrophobic diamine monomer unit, in which the ratio of the hydrophilic monomer unit $A_2$ to the total amount of all monomer units in the polyamide resin is 2.5 mol % to 40 mol %.

<16> The soluble material for three-dimensional modeling according to <15>, wherein a monomer $A_2$ for deriving the hydrophilic monomer unit $A_2$ is preferably at least one type selected from the group consisting of hydroxy group-containing aromatic dicarboxylic acid, primary amino group-containing aromatic dicarboxylic acid, sulfonic acid group-containing aromatic dicarboxylic acid, and sulfonate group-containing aromatic dicarboxylic acid; more preferably at least one type selected from the group consisting of 5-hydroxyisophthalic acid, 1,3,5-benzene tricarboxylic acid, 5-aminoisophthalic acid, 5-sulfoisophthalic acid, 2-sulfoterephthalic acid, and 4-sulfo-2,6-naphthalene dicarboxylic acid; further preferably at least one type selected from the group consisting of 5-sulfoisophthalic acid and 2-sulfoterephthalic acid; further more preferably 5-sulfoisophthalic acid.

<17> The soluble material for three-dimensional modeling according to any one of <4>, <15> and <14>, wherein the content of the hydrophilic group in the polyamide resin is preferably 0.5 mmol/g or more, more preferably 0.6 mmol/g or more, and further preferably 0.7 mmol/g or more; preferably 3.0 mmol/g or less, more preferably 2.0 mmol/g or less, and further preferably 1.5 mmol/g or less; preferably 0.5 mmol/g to 3.0 mmol/g, more preferably 0.6 mmol/g to 2.0 mmol/g, and further preferably 0.7 mmol/g to 1.5 mmol/g.

<18> The soluble material for three-dimensional modeling according to any one of <15> to <17>, wherein the ratio of the amount of the hydrophilic monomer unit $A_2$ to the total amount of monomer units in the polyamide resin is 2.5 mol % or more, preferably 4 mol % or more, more preferably 6 mol % or more, further preferably 8 mol % or more, and further more preferably 10 mol % or more; 40 mol % or less, preferably 35 mol % or less, more preferably 31 mol % or less, further preferably 25 mol % or less, further more preferably 20 mol % or less, especially preferably 15 mol % or less, more especially preferably 10 mol % or less, and more especially preferably 8 mol % or less; preferably 2.5 mol % to 40 mol %, more preferably 4 mol % to 35 mol %, further preferably 6 mol % to 31 mol %, further more preferably 8 mol % to 20 mol %, especially preferably 8 mol % to 15 mol %, and more especially preferably 8 mol % to 12 mol %.

<19> The soluble material for three-dimensional modeling according to any one of <15> to <18>, wherein a dicarboxylic acid $B_2$ for deriving the hydrophobic dicarboxylic acid monomer unit $B_2$ is preferably at least one type selected from the group consisting of aromatic dicarboxylic acid, aliphatic dicarboxylic acid, and alicyclic dicarboxylic acid; more preferably at least one type selected from the group consisting of terephthalic acid, isophthalic acid, 2,5-furan dicarboxylic acid, 2,6-naphthalene dicarboxylic acid, 1,4-cyclohexane dicarboxylic acid, and 1,3-adamantane dicarboxylic acid; further preferably at least one type selected from the group consisting of terephthalic acid, 2,5-furan dicarboxylic acid, and 2,6-naphthalene dicarboxylic acid; further more preferably terephthalic acid.

<20> The soluble material for three-dimensional modeling according to any one of <15> to <19>, wherein the ratio of the amount of the hydrophobic dicarboxylic acid monomer unit $B_2$ in the polyamide resin to the total amount of monomer units in the polyamide resin is preferably 10 mol % or more, more preferably 20 mol % or more, further preferably 30 mol % or more, further more preferably 35 mol % or more, especially preferably 40 mol % or more, and more especially preferably 42 mol % or more; preferably 47.5 mol % or less, more preferably 45 mol % or less, further preferably 42 mol % or less, and further more preferably 40 mol % or less; preferably 10 mol % to 47.5 mol %, more preferably 20 mol % to 45 mol %, and further preferably 30 mol % to 42 mol %.

<21> The soluble material for three-dimensional modeling according to any one of <15> to <20>, wherein the mole ratio of the hydrophilic monomer unit $A_2$ to the hydrophobic dicarboxylic acid monomer unit $B_2$ (hydrophilic monomer unit $A_2$/hydrophobic dicarboxylic acid monomer unit $B_2$) is preferably 10/90 or more, more preferably 15/85 or more, further preferably 18/82 or more, and further more preferably 20/80 or more; preferably 50/50 or less, more preferably 40/60 or less, further preferably 30/70 or less, and further more preferably 25/75 or less.

<22> The soluble material for three-dimensional modeling according to any one of <1> to <21>, wherein the weight average molecular weight of the thermoplastic resin is preferably 3,000 or more, more preferably 3,500 or more, further preferably 4,000 or more; preferably 70,000 or less, more preferably 50,000 or less, further preferably 30,000 or less, and further more preferably 20,000 or less.

<23> The soluble material for three-dimensional modeling according to any one of <1> to <22>, wherein the glass transition temperature (TG) of the thermoplastic resin is preferably 50° C. or higher, more preferably 60° C. or higher, further preferably 70° C. or higher, and even more preferably 80° C. or higher; preferably 250° C. or lower, more preferably 220° C. or lower, further preferably 180° C. or lower, further more preferably 160° C. or lower, further more preferably 140° C. or lower, and further more preferably 120° C. or lower.

<24> The soluble material for three-dimensional modeling according to any one of <1> to <23>, wherein the content of the thermoplastic resin in the soluble material for three-dimensional modeling is preferably 70% by mass or more, and more preferably 80% by mass or more; and preferably 95% by mass or less, and more preferably 90% by mass or less.

<25> The soluble material for three-dimensional modeling according to any one of <1> to <24>, wherein the hydrocarbon group is an aliphatic hydrocarbon group; and the hydrocarbon group has preferably 1 or more carbon atoms, more preferably 4 or more carbon atoms, further preferably 8 or more carbon atoms and preferably 30 or less carbon atoms, more preferably 25 or less carbon atoms, further preferably 20 or less carbon atoms.

<26> The soluble material for three-dimensional modeling according to any one of <1> to <25>, wherein the hydrocarbon group is an alicyclic hydrocarbon group; and the hydrocarbon group has preferably 3 or more carbon atoms, more preferably 5 or more carbon atoms, further preferably 6 or more carbon atoms, furthermore preferably 10 or more carbon atoms and preferably 30 or less carbon atoms, more preferably 25 or less carbon atoms, further preferably 20 or less carbon atoms.

<27> The soluble material for three-dimensional modeling according to any one of <1> to <26>, wherein the hydrocarbon group is an aromatic hydrocarbon group, the hydrocarbon group has preferably 6 or more carbon atoms, more preferably 8 or more carbon atoms, further preferably 10 or more carbon atoms and preferably 30 or less carbon atoms, more preferably 25 or less carbon atoms.

<28> The soluble material for three-dimensional modeling according to any one of <1> to <27>, wherein the substituent group is preferably one containing at least one type selected from the group consisting of a hydrogen atom, a carbon atom, an oxygen atom, a nitrogen atom, a sulfur atom, a phosphorus atom, a silicon atom, and a halogen atom, particularly, the substituent group is preferably a hydrocarbon group or an alkyl halide group having 1 to 22 carbon atoms, more preferably a hydrocarbon group or an alkyl halide group having 1 to 16 carbon atoms, further preferably a hydrocarbon group or an alkyl halide group having 1 to 12 carbon atoms, furthermore preferably a hydrocarbon group having 1 to 12 carbon atoms.

<29> The soluble material for three-dimensional modeling according to any one of <1> to <28>, wherein $X^{n+}$ in the general formula (I) represents a sodium ion, a potassium ion, a lithium ion, an ammonium ion, a phosphonium ion, a magnesium ion, a calcium ion, a barium ion, a zinc ion, or a phosphonium ion, is preferably a sodium ion, a potassium ion, a lithium ion, a magnesium ion, an ammonium ion, or a phosphonium ion, is more preferably a sodium ion, a lithium ion, an ammonium ion, or a phosphonium ion, is further preferably a lithium ion or a phosphonium ion, and is furthermore preferably a phosphonium ion.

<30> The soluble material for three-dimensional modeling according to any one of <1> to <29>, wherein the phosphonium ion is preferably a tetraalkylphosphonium ion, more preferably a tetrabutylphosphonium ion.

<31> The soluble material for three-dimensional modeling according to any one of <1> to <30>, wherein a mass ratio of the organic salt compound to the thermoplastic resin is preferably 0.5 or more, more preferably 2 or more, further preferably 6 or more, preferably 30 or less, more preferably 20 or less, further preferably 15 or less.

<32> The soluble material for three-dimensional modeling according to any one of <1> to <31>, wherein a ratio of an amount (mol) of an alkyl sulfonic acid ion ($R^1$—$SO_3^-$) in the organic salt compound to an amount (mol) of the hydrophilic group in the thermoplastic resin (an amount of an alkyl sulfonic acid ion in the organic salt compound/an amount of the hydrophilic group in the thermoplastic resin) is preferably 0.005 or more, more preferably 0.01 or more, further preferably 0.05 or more, furthermore preferably 0.15 or more, preferably 1.0 or less, more preferably 0.9 or less, further preferably 0.7 or less.

<33> The soluble material for three-dimensional modeling according to any one of <1> to <32>, wherein the glass transition temperature of the soluble material for three-dimensional modeling is preferably 50° C. or higher, more preferably 60° C. or higher, further preferably 70° C. or higher, and further more preferably 80° C. or higher, preferably 250° C. or lower, more preferably 220° C. or lower, and further preferably 200° C. or lower.

<34> The soluble material for three-dimensional modeling according to any one of <1> to <33>, wherein the form of the soluble material for three-dimensional modeling is preferably a filament.

<35> A method for manufacturing a three-dimensional object by a fused deposition modeling system, the method comprising: a step of obtaining a precursor of the three-dimensional object that contains the three-dimensional object and a support material; and a support material removing step of bringing the precursor of the three-dimensional object into contact with neutral water to remove the support material, wherein a material of the support material is the soluble material for three-dimensional modeling according to any one of <1> to <34>.

<36> The method for manufacturing a three-dimensional object by a fused deposition modeling system according to <35>, wherein a material of the three-dimensional object is preferably thermoplastic resins such as an ABS resin, a PP resin, an ASA resin, a PS resin, a HIPS resin, a PVC resin, a polylactate resin, a polycarbonate resin, a polyamide resin, a polyetherimide resin, a polyetheretherketone resin, and a polyphenylsulfone resin, more preferably at least one type selected from the group consisting of an ABS resin, a polylactate resin, a polycarbonate resin, and a polyamide resin, further preferably at least one type selected from the group consisting of an ABS resin, a polycarbonate resin, and a polyamide resin.

<37> The method for manufacturing a three-dimensional object by a fused deposition modeling system according to <35> or <36>, wherein the glass transition temperature of the support material used in the step of obtaining precursor of three-dimensional object is preferably from (the glass transition temperature of the modeling material to be used −20° C.) to (the glass transition temperature of the modeling material to be used +20° C.), more preferably from (the glass transition temperature of the modeling material to be used −15° C.) to (the glass transition temperature of the modeling material to be used +15° C.)

<38> The method for manufacturing a three-dimensional object by a fused deposition modeling system according to any one of <35> to <37>, wherein the method of making the precursor of the three-dimensional object contact the neutral water is preferably a method of soaking the precursor of the three-dimensional object in the neutral water.

<39> The method for manufacturing a three-dimensional object by a fused deposition modeling system according to any one of <35> to <37>, wherein the neutral water contains a water-soluble organic solvent.

<40> The method for manufacturing a three-dimensional object by a fused deposition modeling system according to <39>, wherein the water-soluble organic solvent is preferably lower alcohols such as methanol, ethanol, and 2-propanol; glycol ethers such as propylene glycol monomethyl ether, ethylene glycol monoethyl ether, ethylene glycol mono-t-butyl ether, and diethylene glycol monobutyl ether; and ketones such as acetone, and methyl ethyl ketone.

<41> The method for manufacturing a three-dimensional object by a fused deposition modeling system according to <39> or <40>, wherein the content of the water-soluble organic solvent in the neutral water is preferably 0.1% or more by mass, more preferably 0.5% or more by mass, even more preferably 1% or more by mass, even more preferably 3% or more by mass, and is preferably 50% or less by mass, more preferably 40% or less by mass, further preferably 30% or less by mass, further more preferably 20% or less by mass.

<42> The method for manufacturing a three-dimensional object by a fused deposition modeling system according to any one of <35> to <41>, wherein the amount of the neutral water used is preferably 10 mass times or more, and more preferably 20 mass times or more the support material, preferably 10,000 mass times or less, more preferably 5,000 mass times or less, further preferably 1,000 mass times or less, and further preferably 100 mass times or less the support material.

<43> The method for manufacturing a three-dimensional object by a fused deposition modeling system according to any one of <35> to <42>, wherein the period over which the soluble material for three-dimensional modeling is caused to contact the neutral water is preferably 5 minutes or longer, preferably 180 minutes or shorter, more preferably 120 minutes or shorter, even more preferably 90 minutes or shorter.

<44> The method for manufacturing a three-dimensional object by a fused deposition modeling system according to any one of <35> to <43>, wherein the washing temperature is preferably 15° C. or higher, more preferably 25° C. or higher, even more preferably 30° C. or higher, even more preferably 40° C. or higher preferably 85° C. or lower, more preferably 70° C. or lower, even more preferably 60° C. or lower.

<45> A support material for supporting a three-dimensional object when the three-dimensional object is manufactured by a 3D printer of a fused deposition modeling system, the support material comprising a thermoplastic resin having a hydrophilic group and an organic salt compound represented by a general formula (I) below:

$$(R^1\text{—}SO_3^-)_n X^{n+} \quad (I)$$

wherein $R^1$ represents a hydrocarbon group that optionally has a substituent group and that has 1 to 30 carbon atoms; n represents a number of 1 or 2; when n is 1, $X^{n+}$ represents a sodium ion, a potassium ion, a lithium ion, an ammonium ion, or a phosphonium ion; and when n is 2, $X^{n+}$ represents a magnesium ion, a calcium ion, a barium ion, or a zinc ion.

<46> The support material according to <45>, wherein the material of the support material is the soluble material for three-dimensional modeling according to any one of <1> to <32>.

<47> Use of the thermoplastic resin according to any one of <1> to <34> as a soluble material for three-dimensional modeling.

EXAMPLES

<Synthesis of Thermoplastic Resin>

Synthesis Example 1

4.09 kg of 2,6-naphthalene dimethylcarbonate (manufactured by BP p.l.c.), 3.20 kg of ethylene glycol (special grade, manufactured by Wako Pure Chemical Corporation), 1.69 kg of sodium dimethyl 5-sulfoisophthalate (manufactured by Takemoto Oil & Fat Co., Ltd.), 1.71 kg of titanium tetrabutoxide (first grade, manufactured by Tokyo Chemical Industry Co., Ltd.), and 42.0 g of sodium acetate trihydrate (special grade, manufactured by Wako Pure Chemical Corporation) were prepared in a 100-liter stainless steel reactor (equipped with a stirrer and a nitrogen introducing tube). The temperature was increased from a room temperature up to 230° C. by taking 1.5 hours at a normal pressure under a nitrogen atmosphere. The mixture was heated at 230° C. for 360 minutes to perform a transesterification. 637 mg of 85% phosphoric acid (special grade, manufactured by Sigma-Aldrich Japan) was added to the mixture and the mixture was stirred for 10 minutes. While stirring, the temperature was increased from 230° C. up to 260° C. by taking 150 minutes; and at the same time, the pressure was decreased to 30 mmHg to perform a polycondensation. A polyester resin 1 (a light brown solid at room temperature) was obtained.

Synthesis Example 2

The synthesis example 2 was performed in the same way as the synthesis example 1 except that the amount of sodium acetate trihydrate was changed to 74.1 g to obtain a polyester resin 2.

<Analysis of Thermoplastic Resin>
[Composition of Thermoplastic Resin]

A proton NMR measurement can be performed using MR400 (NMR manufactured by Agilent Technologies, Inc.) to obtain the compositions of the polyester resin 1.

[Amount of Hydrophilic Group in Thermoplastic Resin]

The amount (unit: mmol/g) of the hydrophilic group ($SO_3$) in the polyester resin 1 can be obtained from the composition of the polyester resin 1 measured with the above-described method.

[Weight Average Molecular Weight]

10 mg of each of the polyester resin 1 was dissolved into 3 g of HFIP (1,1,1,3,3,3-hexafluoro-2-propanol, manufactured by Wako Pure Chemical Corporation) for 8 hours and the weight average molecular weight was measured by a gel permeation chromatography (GPC). The weight average molecular weight of the polyester resin 1 was preferably 22000.

Tester: HLC-8320GPC (manufactured by TOSOH Corporation)
Eluent: HFIP/0.5 mM sodium trifluoroacetate
Flow rate: 0.2 mL/min
Test temperature: 40° C.
Column for analysis: TSK-Gel Super AWM-H (manufactured by TOSOH Corporation)
Calibration curve: Shodex STANDARD M-75
Standard: Polymethylmethacrylate (PMMA)

[Glass Transition Temperature]

A press machine ("LABO PRESS P2-30T" manufactured by Toyo Seiki Seisaku-sho, Ltd.) was used to press each of the polyester resin 1 with a pressure of 0.5 MPa at 230° C. for 2 minutes and then 20 MPa at 230° C. for 2 minutes. Each of the pressed polyester resins was rapidly cooled to produce a sheet of 0.4 mm thick. 5 mg to 10 mg of a sample was cut out from the sheet with a pair of scissors. The sample was precisely weighed and sealed in an aluminum pan. By using a DSC ("DSC7020" manufactured by Seiko Instruments Inc.), the temperature of the aluminum pan with the sample was increased from 30° C. to 250° C. at 10° C./min and the heated aluminum pan with the sample was rapidly cooled to 30° C. Then, the temperature of the aluminum pan with the sample was increased again to 250° C. at 10° C./min to obtain a DSC curve. The glass transition temperature (° C.) was obtained from the DSC curve.

Examples 1 to 6 and Comparative Example 1

Example 1

[Preparation of Soluble Material for Three-Dimensional Modeling]

The following were dried at 60° C. under reduced pressure: 84.4 g of the polyester resin 1 obtained in Synthesis Example 1, 10.5 g of KURARITY $LA_{2250}$ (manufactured by Kuraray Co., Ltd.: thermoplastic elastomer: triblock copolymer of polymethyl methacrylate-polybutyl acrylate-polymethyl methacrylate), 4.2 g of Bondfast (registered trade name) 7B (manufactured by SUMITOMO CHEMICAL COMPANY, LIMITED: copolymer of ethylene-vinyl acetate-glycidyl methacrylate) as a compatibilizer, and 0.8 g of ELECUT S-418 (manufactured by TAKEMOTO OIL & FAT Co., Ltd.: organic salt: tetrabutylphosphonium dodecylbenzenesulfonate). Then, a melt kneader (manufactured by Toyo Seiki Seisaku-sho, Ltd.: Labo Plastmill 4C150) was used to melt and knead these components at 230° C. and 90 r/min for 10 minutes to give a white mixture as a soluble material for three-dimensional modeling 1.

[Manufacturing of Filament]

Sample pieces obtained by finely crushing the soluble material for three-dimensional modeling 1 were, using a capilograph (manufactured by Toyo Seiki Seisaku-sho, Ltd.: Capilograph 1D), subjected to extrusion through a capillary having a diameter of 2.0 mm and a length of 10 mm at a melt temperature of 180° C. and an extrusion speed of 10 mm/min. The tip of the extruded sample was pinched with tweezers and lightly and manually pulled to process the extruded sample into a filament having a diameter of 1.7 mm. Thereafter, the filament was fed to a 3D printer Replicator 2x manufactured by MakerBot Industries, LLC and subjected to extrusion through a heat nozzle having a temperature of 250° C. It was confirmed that the melted composition was discharged without clogging the nozzle and was solidified right away.

Example 2

[Preparation of Soluble Material for Three-Dimensional Modeling]

The following were dried at 60° C. under reduced pressure: 81.6 g of the polyester resin 1 obtained in Synthesis Example 1, 10.2 g of KURARITY $LA_{2250}$ (Kuraray Co., Ltd.: thermoplastic elastomer: triblock copolymer of polymethyl methacrylate-polybutyl acrylate-polymethyl methacrylate), 4.1 g of Bondfast (registered trade name) 7B (manufactured by SUMITOMO CHEMICAL COMPANY, LIMITED: copolymer of ethylene-vinyl acetate-glycidyl methacrylate) as a compatibilizer, and 4.1 g of ELECUT S-418 (manufactured by TAKEMOTO OIL & FAT Co., Ltd.: organic salt: tetrabutylphosphonium dodecylbenzenesulfonate). Then, a melt kneader (manufactured by Toyo Seiki Seisaku-sho, Ltd.: Labo Plastmill 4C150) was used to melt and knead these components at 230° C. and 90 r/min for 10 minutes to give a white mixture as a soluble material for three-dimensional modeling 2.

[Manufacturing of Filament]

The manufacturing of a filament was performed in the same manner as the manufacturing of the filament in Example 1 except that the soluble material for three-dimensional modeling 2 was used in place of the soluble material for three-dimensional modeling 1. Thereafter, the filament was fed to a 3D printer Replicator 2× manufactured by MakerBot Industries, LLC and subjected to extrusion through a heat nozzle having a temperature of 250° C. It was confirmed that the melted composition was discharged without clogging the nozzle and was solidified right away.

Example 3

[Preparation of Soluble Material for Three-Dimensional Modeling]

The following were dried at 60° C. under reduced pressure: 78.4 g of the polyester resin 1 obtained in Synthesis Example 1, 9.8 g of KURARITY $LA_{2250}$ (manufactured by Kuraray Co., Ltd.: thermoplastic elastomer: triblock copolymer of polymethyl methacrylate-polybutyl acrylate-polymethyl methacrylate), 3.9 g of Bondfast (registered trade name) 7B (manufactured by SUMITOMO CHEMICAL COMPANY, LIMITED: copolymer of ethylene-vinyl acetate-glycidyl methacrylate) as a compatibilizer, and 7.8 g of ELECUT S-418 (manufactured by TAKEMOTO OIL & FAT Co., Ltd.: organic salt: tetrabutylphosphonium dodecylbenzenesulfonate). Then, a melt kneader (manufactured by Toyo Seiki Seisaku-sho, Ltd.: Labo Plastmill 4C150) was used to melt and knead these components at 230° C. and 90 r/min for 10 minutes to give a white mixture as a soluble material for three-dimensional modeling 3.

[Manufacturing of Filament]

The manufacturing of a filament was performed in the same manner as the manufacturing of the filament in Example 1 except that the soluble material for three-dimensional modeling 3 was used in place of the soluble material for three-dimensional modeling 1. Thereafter, the filament was fed to a 3D printer Replicator 2× manufactured by MakerBot Industries, LLC and subjected to extrusion through a heat nozzle having a temperature of 250° C. It was confirmed that the melted composition was discharged without clogging the nozzle and was solidified right away.

Example 4

[Preparation of Soluble Material for Three-Dimensional Modeling]

The following were dried at 60° C. under reduced pressure: 84.4 g of the polyester resin 1 obtained in Synthesis Example 1, 10.5 g of KURARITY $LA_{2250}$ (manufactured by Kuraray Co., Ltd.: thermoplastic elastomer: triblock copolymer of polymethyl methacrylate-polybutyl acrylate-polymethyl methacrylate), 4.2 g of Bondfast (registered trade name) 7B (manufactured by SUMITOMO CHEMICAL COMPANY, LIMITED: copolymer of ethylene-vinyl acetate-glycidyl methacrylate) as a compatibilizer, and 0.8 g of lithium trifluoromethanesulfonate (manufactured by Wako Pure Chemical Industries, Ltd.). Then, a melt kneader (manufactured by Toyo Seiki Seisaku-sho, Ltd.: Labo Plastmill 4C150) was used to melt and knead these components at 230° C. and 90 r/min for 10 minutes to give a white mixture as a soluble material for three-dimensional modeling 4.

[Manufacturing of Filament]

The manufacturing of a filament was performed in the same manner as the manufacturing of the filament in Example 1 except that the soluble material for three-dimensional modeling 4 was used in place of the soluble material for three-dimensional modeling 1. Thereafter, the filament was fed to a 3D printer Replicator 2× manufactured by MakerBot Industries, LLC and subjected to extrusion through a heat nozzle having a temperature of 250° C. It was confirmed that the melted composition was discharged without clogging the nozzle and was solidified right away.

Example 5

[Preparation of Soluble Material for Three-Dimensional Modeling]

The following were dried at 60° C. under reduced pressure: 81.6 g of the polyester resin 1 obtained 1 in Synthesis Example 1, 10.2 g of KURARITY $LA_{2250}$ (Kuraray Co., Ltd.: thermoplastic elastomer: triblock copolymer of polymethyl methacrylate-polybutyl acrylate-polymethyl methacrylate), 4.1 g of Bondfast (registered trade name) 7B (manufactured by SUMITOMO CHEMICAL COMPANY, LIMITED: copolymer of ethylene-vinyl acetate-glycidyl methacrylate) as a compatibilizer, and 4.1 g of lithium trifluoromethanesulfonate (manufactured by Wako Pure Chemical Industries, Ltd.). Then, a melt kneader (manufactured by Toyo Seiki Seisaku-sho, Ltd.: Labo Plastmill 4C150) was used to melt and knead these components at 230° C. and 90 r/min for 10 minutes to give a white mixture as a soluble material for three-dimensional modeling 5.

[Manufacturing of Filament]

The manufacturing of a filament was performed in the same manner as the manufacturing of the filament in Example 1 except that the soluble material for three-dimensional modeling 5 was used in place of the soluble material for three-dimensional modeling 1. Thereafter, the filament was fed to a 3D printer Replicator 2× manufactured by MakerBot Industries, LLC and subjected to extrusion through a heat nozzle having a temperature of 250° C. It was confirmed that the melted composition was discharged without clogging the nozzle and was solidified right away.

Example 6

[Preparation of Soluble Material for Three-Dimensional Modeling]

The following were dried at 60° C. under reduced pressure: 78.4 g of the polyester resin 1 obtained in Synthesis Example 1, 9.8 g of KURARITY $LA_{2250}$ (manufactured by Kuraray Co., Ltd.: thermoplastic elastomer: triblock copolymer of polymethyl methacrylate-polybutyl acrylate-polymethyl methacrylate), 3.9 g of Bondfast (registered trade name) 7B (manufactured by SUMITOMO CHEMICAL COMPANY, LIMITED: copolymer of ethylene-vinyl acetate-glycidyl methacrylate) as a compatibilizer, and 7.8 g of lithium trifluoromethanesulfonate (manufactured by Wako Pure Chemical Industries, Ltd.). Then, a melt kneader (manufactured by Toyo Seiki Seisaku-sho, Ltd.: Labo Plastmill 4C150) was used to melt and knead these components at 230° C. and 90 r/min for 10 minutes to give a white mixture as a soluble material for three-dimensional modeling 6.

[Manufacturing of Filament]

The manufacturing of a filament was performed in the same manner as the manufacturing of the filament in Example 1 except that the soluble material for three-dimensional modeling 6 was used in place of the soluble material for three-dimensional modeling 1. Thereafter, the filament was fed to a 3D printer Replicator 2× manufactured by MakerBot Industries, LLC and subjected to extrusion through a heat nozzle having a temperature of 250° C. It was confirmed that the melted composition was discharged without clogging the nozzle and was solidified right away.

Comparative Example 1

[Preparation of Soluble Material for Three-Dimensional Modeling]

The following were dried at 60° C. under reduced pressure: 85.1 g of the polyester resin 1 obtained in Synthesis Example 1, 10.6 g of KURARITY $LA_{2250}$ (manufactured by Kuraray Co., Ltd.: thermoplastic elastomer: triblock copolymer of polymethyl methacrylate-polybutyl acrylate-polymethyl methacrylate), and 4.3 g of Bondfast (registered trade name) 7B (manufactured by SUMITOMO CHEMICAL COMPANY, LIMITED: copolymer of ethylene-vinyl acetate-glycidyl methacrylate) as a compatibilizer. Then, a melt kneader (manufactured by Toyo Seiki Seisaku-sho, Ltd.: Labo Plastmill 4C150) was used to melt and knead these components at 230° C. and 90 r/min for 10 minutes to give a white mixture as a soluble material for three-dimensional modeling 7.

[Manufacturing of Filament]

The manufacturing of a filament was performed in the same manner as the manufacturing of the filament in Example 1 except that the soluble material for three-dimensional modeling 7 was used in place of the soluble material for three-dimensional modeling 1 and the melt temperature was changed to 210° C. Thereafter, the filament was fed to a 3D printer Replicator 2× manufactured by MakerBot Industries, LLC and subjected to extrusion through a heat nozzle having a temperature of 250° C. It was confirmed that the melted composition was discharged without clogging the nozzle and was solidified right away.

Example 7

[Preparation of Soluble Material for Three-Dimensional Modeling]

The following were dried at 60° C. under reduced pressure: 83.0 g of the polyester resin 2 obtained in Synthesis Example 2, 10.4 g of KURARITY $LA_{2250}$ (Kuraray Co., Ltd.: thermoplastic elastomer: triblock copolymer of polymethyl methacrylate-polybutyl acrylate-polymethyl methacrylate), 4.1 g of Bondfast (registered trade name) 7B (manufactured by SUMITOMO CHEMICAL COMPANY, LIMITED: copolymer of ethylene-vinyl acetate-glycidyl methacrylate) as a compatibilizer, and 2.5 g of ELECUT S-418 (manufactured by TAKEMOTO OIL & FAT Co., Ltd.: organic salt: tetrabutylphosphonium dodecylbenzenesulfonate). Then, a melt kneader (manufactured by Toyo Seiki Seisaku-sho, Ltd.: Labo Plastmill 4C150) was used to melt and knead these components at 230° C. and 90 r/min for 10 minutes to give a white mixture as a soluble material for three-dimensional modeling 8.

[Manufacturing of Filament]

The manufacturing of a filament was performed in the same manner as the manufacturing of the filament in Example 1 except that the soluble material for three-dimensional modeling 8 was used in place of the soluble material for three-dimensional modeling 1. Thereafter, the filament was fed to a 3D printer Replicator 2× manufactured by MakerBot Industries, LLC and subjected to extrusion through a heat nozzle having a temperature of 250° C. It was confirmed that the melted composition was discharged without clogging the nozzle and was solidified right away.

Example 8

[Preparation of Soluble Material for Three-Dimensional Modeling]

The following were dried at 60° C. under reduced pressure: 81.6 g of the polyester resin 2 obtained in Synthesis Example 2, 10.2 g of KURARITY $LA_{2250}$ (Kuraray Co., Ltd.: thermoplastic elastomer: triblock copolymer of polymethyl methacrylate-polybutyl acrylate-polymethyl methacrylate), 4.1 g of Bondfast (registered trade name) 7B (manufactured by SUMITOMO CHEMICAL COMPANY, LIMITED: copolymer of ethylene-vinyl acetate-glycidyl methacrylate) as a compatibilizer, and 4.1 g of ELECUT S-418 (manufactured by TAKEMOTO OIL & FAT Co., Ltd.: organic salt: tetrabutylphosphonium dodecylbenzenesulfonate). Then, a melt kneader (manufactured by Toyo Seiki Seisaku-sho, Ltd.: Labo Plastmill 4C150) was used to melt and knead these components at 230° C. and 90 r/min for 10 minutes to give a white mixture as a soluble material for three-dimensional modeling 9.

[Manufacturing of Filament]

The manufacturing of a filament was performed in the same manner as the manufacturing of the filament in Example 1 except that the soluble material for three-dimensional modeling 9 was used in place of the soluble material for three-dimensional modeling 1. Thereafter, the filament was fed to a 3D printer Replicator 2× manufactured by MakerBot Industries, LLC and subjected to extrusion through a heat nozzle having a temperature of 250° C. It was confirmed that the melted composition was discharged without clogging the nozzle and was solidified right away.

Comparative Example 2

[Preparation of Soluble Material for Three-Dimensional Modeling]

The following were dried at 60° C. under reduced pressure: 85.1 g of the polyester resin 2 obtained in Synthesis Example 2, 10.6 g of KURARITY $LA_{2250}$ (manufactured by Kuraray Co., Ltd.: thermoplastic elastomer: triblock copolymer of polymethyl methacrylate-polybutyl acrylate-polymethyl methacrylate), and 4.3 g of Bondfast (registered trade name) 7B (manufactured by SUMITOMO CHEMICAL COMPANY, LIMITED: copolymer of ethylene-vinyl acetate-glycidyl methacrylate) as a compatibilizer. Then, a melt kneader (manufactured by Toyo Seiki Seisaku-sho, Ltd.: Labo Plastmill 4C150) was used to melt and knead these components at 230° C. and 90 r/min for 10 minutes to give a white mixture as a soluble material for three-dimensional modeling 10.

[Manufacturing of Filament]

The manufacturing of a filament was performed in the same manner as the manufacturing of the filament in Example 1 except that the soluble material for three-dimensional modeling 10 was used in place of the soluble material for three-dimensional modeling 1 and the melt temperature was changed to 210° C. Thereafter, the filament was fed to a 3D printer Replicator 2× manufactured by MakerBot Industries, LLC and subjected to extrusion through a heat nozzle having a temperature of 250° C. It was confirmed that the melted composition was discharged without clogging the nozzle and was solidified right away.

<Analysis of Filament>
[Glass Transition Temperature]

The analysis was performed in the same manner as the method for analyzing the glass transition temperature of the base polymer. Table 1 shows evaluation results.

[Filament Dissolution Time]

Water in an amount of 1 L was placed in a 1-L beaker, and heated to 70° C. by a heater while stirred at 300 rpm using a magnetic stirrer. A resin filament (a diameter of about 1.7 mm and a length of 13 cm) formed by a capilograph was suspended from above the beaker, soaked in the hot water, and measured for the time to the dissolution and the cutting of the filament using a stopwatch. Table 1 shows evaluation results.

[Adhesive Properties to Modeling Material]
[Adhesive Properties to ABS Resin]

Examples 1 to 7 and Comparative Examples 1 and 2

The resin filament formed by the capilograph in each of Examples 1 to 7 and Comparative Examples 1 and 2 and ABSP430 (manufactured by Stratasys Ltd.: modeling material filament: ABS resin, glass transition temperature: 108° C.) were fed to a 3D printer Replicator 2× manufactured by MakerBot Industries, LLC and subjected to extrusion alternately through heat nozzles having temperatures of 250° C. and 230° C., respectively for modeling to produce evaluation samples of Examples 1 to 7 and Comparative Examples 1 and 2. FIG. 1 is a photograph showing one of the modeled evaluation samples. In FIG. 1, an evaluation sample 1 includes a modeling material 11 and a support material 12 placed on the modeling material 11 for layering. The evaluation samples of Examples 1 to 7 and Comparative Examples 1 and 2 were evaluated for the adhesive properties to the ABS resin by evaluating, under the following criteria, the degree of unlikeliness of peeling between the modeling material 11 and the support material 12 when a resin interface between the materials was scraped with a spatula. Table 1 shows evaluation results.

A: the interface causes no peeling even when scraped with a metal spatula.

B: the interface causes peeling when strongly scraped with a metal spatula.

C: the interface causes peeling when touched with a metal spatula.

D: the interface causes peeling during modeling.

[Adhesive Properties to Polyamide Resin]

Examples 7 and 8 and Comparative Example 2

The resin filament formed by the capilograph in each of Examples 7 and 8 and Comparative Example 2 and FDM Nylon12 (manufactured by Stratasys Ltd.: modeling material filament: polyamide resin, crystallization temperature: 148° C., melting point: 178° C.) were fed to a 3D printer Replicator 2× manufactured by MakerBot Industries, LLC and subjected to extrusion alternately through heat nozzles having temperatures of 250° C. and 255° C., respectively for modeling to produce evaluation samples of Examples 7 and 8 and Comparative Example 2. The evaluation of the adhesive properties to the polyamide resin was performed in the same manner as the evaluation of the adhesive properties to the ABS resin except for using these evaluation samples. Table 1 shows evaluation results.

[Adhesive Properties to Polycarbonate Resin]

Examples 7 and 8 and Comparative Example 2

The resin filament formed by the capilograph in each of Examples 7 and 8 and Comparative Example 2 and PC-10 (manufactured by Stratasys Ltd.: modeling material filament: polycarbonate resin, glass transition temperature: 145° C.) were fed to a 3D printer Replicator 2× manufactured by MakerBot Industries, LLC and subjected to extrusion alternately through heat nozzles having temperatures of 250° C. and 255° C., respectively for modeling to produce evaluation samples of Examples 7 and 8 and Comparative Example 2. The evaluation of the adhesive properties to the polycarbonate resin was performed in the same manner as the evaluation of the adhesive properties to the ABS resin except for using these evaluation samples. Table 1 shows evaluation results.

TABLE 1

| | Thermoplastic resin | | Elastomer Amount (part by mass) relative to 100 parts by mass of thermoplastic resin | Compatibilizer Amount (part by mass) relative to 100 parts by mass of thermoplastic resin | Organic salt compound | |
|---|---|---|---|---|---|---|
| | | | | | Phosphonium dodecylbenzenesulfonate | Lithium trifluoromethanesulfonate |
| | Polyester resin 1 (part by mass) | Polyester resin 2 (part by mass) | | | Amount (part by mass) relative to 100 parts by mass of thermoplastic resin | Amount (part by mass) relative to 100 parts by mass of thermoplastic resin |
| Example 1 | 100 | — | 12.5 | 5 | 1 | — |
| Example 2 | 100 | — | 12.5 | 5 | 5 | — |
| Example 3 | 100 | — | 12.5 | 5 | 10 | — |
| Example 4 | 100 | — | 12.5 | 5 | — | 1 |
| Example 5 | 100 | — | 12.5 | 5 | — | 5 |
| Example 6 | 100 | — | 12.5 | 5 | — | 10 |
| Comparative Example 1 | 100 | — | 12.5 | 5 | — | — |
| Example 7 | — | 100 | 12.5 | 5 | 3 | — |
| Example 8 | — | 100 | 12.5 | 5 | 5 | — |
| Comparative Example 2 | — | 100 | 12.5 | 5 | — | — |

| | Mol ratio of alkylsulfonic acid ion to hydrophilic group A | Glass transition temperature (°C.) | Filament dissolution time (min) | Adhesive properties to ABS resin | Adhesive properties to polyamide resin | Adhesive properties to polycarbonate resin |
|---|---|---|---|---|---|---|
| Example 1 | 0.017 | 101 | 3.5 | C | — | — |
| Example 2 | 0.083 | 100 | 2.0 | A | — | — |
| Example 3 | 0.167 | 96 | 1.0 | A | — | — |
| Example 4 | 0.064 | 103 | 3.0 | C | — | — |
| Example 5 | 0.321 | 108 | 2.0 | B | — | — |
| Example 6 | 0.641 | 119 | 3.0 | A | — | — |
| Comparative Example 1 | — | 102 | 4.0 | D | — | — |
| Example 7 | 0.055 | 110 | 2.6 | B | C | D |
| Example 8 | 0.083 | 109 | 2.1 | A | B | C |
| Comparative Example 2 | — | 111 | 4.8 | D | D | D |

DESCRIPTION OF REFERENCE SIGNS

1 Evaluation sample
11 Modeling material
12 Support material

The invention claimed is:

1. A soluble material for three-dimensional modeling used as a material of a support material for supporting a three-dimensional object when the three-dimensional object is manufactured by a 3D printer of a fused deposition modeling system, the soluble material comprising
a thermoplastic resin having a hydrophilic group and
an organic salt compound represented by formula (I) below:

$$(R^1—SO_3^-)_n X^{n+} \quad (I)$$

where $R^1$ represents a hydrocarbon group that optionally has a substituent group and that has 1 to 30 carbon atoms; n represents a number of 1 or 2; when n is 1, $X^{n+}$ represents a sodium ion, a potassium ion, a lithium ion, an ammonium ion, or a phosphonium ion; and when n is 2, $X^{n+}$ represents a magnesium ion, a calcium ion, a barium ion, or a zinc ion,
wherein a content of the hydrophilic group in the thermoplastic resin is 0.5 mmol/g or more and 3.0 mmol/g or less.

2. The soluble material for three-dimensional modeling according to claim 1, wherein the thermoplastic resin is at least one type selected from the group consisting of a polyester resin, a polyamide resin, an acrylic resin, a polyvinyl alcohol resin, a polyvinyl pyrrolidone resin, a polyester amide resin, and a polyurethane resin.

3. The soluble material for three-dimensional modeling according to claim 1, wherein the hydrophilic group is a sulfonate group.

4. The soluble material for three-dimensional modeling according to claim 1, having a filament shape.

5. The soluble material for three-dimensional modeling according to claim 2, wherein the thermoplastic resin is a polyester resin, which has a hydrophilic monomer unit A1 having the hydrophilic group, a hydrophobic dicarboxylic acid monomer unit B1, and a diol monomer unit, and a proportion of the hydrophilic monomer unit A1 to a total of the hydrophilic monomer unit A1 and the hydrophobic dicarboxylic acid monomer unit B1 in the polyester resin is 10 mol % or more and 70 mol % or less.

6. The soluble material for three-dimensional modeling according to claim 1, wherein a content of the thermoplastic resin in the soluble material for three-dimensional modeling is 70% by mass or more.

7. The soluble material for three-dimensional modeling according to claim 6, wherein the content of the thermoplastic resin in the soluble material for three-dimensional modeling is 95% by mass or less.

8. The soluble material for three-dimensional modeling according to claim 2, wherein the thermoplastic resin has a weight-average molecular weight of 3000 or more and 70000 or less.

9. The soluble material for three-dimensional modeling according to claim 1, wherein n is 1 and $X^{n+}$ is the phosphonium ion, which is a tetraalkylphosphonium ion.

10. The soluble material for three-dimensional modeling according to claim 1, wherein a mass ratio of the organic salt compound to the thermoplastic resin is 0.5 or more and 30 or less.

11. The soluble material for three-dimensional modeling according to claim 1, wherein a molar ratio of an alkyl sulfonic acid ion ($R^1$—$SO_3^-$) in the organic salt compound to the hydrophilic group in the thermoplastic resin is 0.005 or more and 1.0 or less.

12. A method for manufacturing a three-dimensional object by a fused deposition modeling system, the method comprising:
    bringing a precursor of the three-dimensional object that contains the three-dimensional object and a support material into contact with neutral water to remove the support material,
    wherein a material of the support material is the soluble material for three-dimensional modeling according to claim 1.

13. The method according to claim 12, wherein a modeling material that is a material of the three-dimensional object is at least one type selected from the group consisting of an ABS resin, a PP resin, an ASA resin, a PS resin, an HIPS resin, a PVC resin, a polylactic acid resin, a polycarbonate resin, a polyamide resin, a polyetherimide resin, a polyether ether ketone resin, and a polyphenylsulfone resin.

14. The method according to claim 12, wherein the support material is removed by soaking the precursor of the three-dimensional object in the neutral water and dissolving the support material.

* * * * *